(12) United States Patent
Pigeon et al.

(10) Patent No.: US 8,224,104 B2
(45) Date of Patent: Jul. 17, 2012

(54) SYSTEM AND METHOD FOR PREDICTING THE FILE SIZE OF IMAGES SUBJECT TO TRANSFORMATION BY SCALING AND A CHANGE OF QUALITY-CONTROLLING PARAMETERS

(75) Inventors: Steven Pigeon, Blainville (CA); Jean-François Franche, Mascouche (CA); Stéphane Coulombe, Brossard (CA)

(73) Assignee: Ecole de Technologie Superieure, Montreal (CA)

( * ) Notice: Subject to any disclaimer, the term of this patent is extended or adjusted under 35 U.S.C. 154(b) by 0 days.

(21) Appl. No.: 12/741,032

(22) PCT Filed: Nov. 2, 2007

(86) PCT No.: PCT/CA2007/001974
§ 371 (c)(1),
(2), (4) Date: May 2, 2010

(87) PCT Pub. No.: WO2009/055896
PCT Pub. Date: May 7, 2009

(65) Prior Publication Data
US 2010/0254629 A1 Oct. 7, 2010

(51) Int. Cl.
*G06K 9/36* (2006.01)
*G06F 15/177* (2006.01)
(52) U.S. Cl. ........ 382/239; 715/735; 382/232; 382/233; 382/235; 382/240
(58) Field of Classification Search .................. 382/232, 382/233, 235, 240; 375/240.16
See application file for complete search history.

(56) References Cited

U.S. PATENT DOCUMENTS

| 6,154,572 | A | 11/2000 | Chaddha |
| 6,233,359 | B1 | 5/2001 | Ratnakar |
| 6,421,467 | B1 * | 7/2002 | Mitra ............................. 382/240 |

(Continued)

FOREIGN PATENT DOCUMENTS

WO    WO 2006/085301    8/2006

(Continued)

OTHER PUBLICATIONS

Shatz et al. "Image adaptation with target size, quality and resolution constraints", WO 2006/085301 A2 Published Aug. 17, 2006.*

(Continued)

*Primary Examiner* — Chan Park
*Assistant Examiner* — Ha Le
(74) *Attorney, Agent, or Firm* — IP-MEX Inc.; Victoria Donnelly

(57) ABSTRACT

A system and method for predicting a file size of an image subject to transformation by scaling and a change about at least one quality-controlling parameter, in which an input receives (a) the file size of the image before transformation, (b) information about at least one quality-controlling parameter of the image before transformation, (c) information about at least one quality-controlling parameter for application to the image during transformation, and (d) a scaling factor for application to the image during transformation. A relative size prediction is calculated on the basis of the received quality-controlling parameters information and scaling factor. The file size of the image after transformation is finally calculated as a function of the file size of the image before transformation and the calculated relative size prediction.

30 Claims, 7 Drawing Sheets

U.S. PATENT DOCUMENTS

| | | | |
|---|---|---|---|
| 6,490,320 | B1 | 12/2002 | Vetro et al. |
| 6,563,517 | B1 * | 5/2003 | Bhagwat et al. ............. 715/735 |
| 6,990,146 | B2 | 1/2006 | Chen |
| 6,992,686 | B2 | 1/2006 | Nagarajan |
| 7,142,601 | B2 * | 11/2006 | Kong et al. ............. 375/240.16 |
| 7,177,356 | B2 | 2/2007 | Moni et al. |
| 7,245,842 | B2 | 7/2007 | Hino |
| 7,440,626 | B2 | 10/2008 | Kong et al. |
| 7,583,844 | B2 * | 9/2009 | Fehmi et al. ................. 382/232 |
| 7,668,397 | B2 | 2/2010 | Le Dinh |
| 7,805,292 | B2 | 9/2010 | Huo et al. |
| 8,073,275 | B2 * | 12/2011 | Shatz et al. ................... 382/239 |
| 2003/0161541 | A1 | 8/2003 | Ridge |
| 2004/0220891 | A1 | 11/2004 | Dodgson |
| 2007/0160133 | A1 * | 7/2007 | Bao et al. .................. 375/240.1 |
| 2007/0239634 | A1 | 10/2007 | Tian |
| 2008/0123741 | A1 | 5/2008 | Li et al. |
| 2008/0279275 | A1 * | 11/2008 | Suzuki ..................... 375/240.03 |
| 2009/0016434 | A1 * | 1/2009 | Amonou et al. ......... 375/240.12 |
| 2009/0141990 | A1 | 6/2009 | Pigeon et al. |
| 2009/0141992 | A1 | 6/2009 | Coulombe et al. |
| 2010/0150459 | A1 | 6/2010 | Coulombe et al. |

FOREIGN PATENT DOCUMENTS

| | | |
|---|---|---|
| WO | WO 2006085301 | 8/2006 |
| WO | WO 2006/097144 | 9/2006 |
| WO | WO 2006094000 | 9/2006 |
| WO | WO 2006110975 | 10/2006 |

OTHER PUBLICATIONS

3GPP in 3GPP TS 23.140 V6.14.0 (Nov. 6, 2006) Technical Specification 3rd Generation Partnership Project; Technical Specification Group Core Network and Terminals; Multimedia Messaging Service (MMS); Functional description; Stage 2 (Release 6) at http://www.3gpp.org/ftp/Specs/html-info/23140.htm (document http://www.3gpp.org/FTP/Specs/archive/23_series/23.140/23140-6e0.zip).

Multimedia Messaging Service, Media formats and codecs 3GPP TS 26.140, V 7.1.0, http:// www.3gpp.org/ftp/specs/html-info/26140.htm, Jun. 2007.

"The independent JPEG Group" ftp.uu.net/graphics/jpeg/jpegsrc.v6b.tar.gz, Aug. 3, 2007.

S. Coulombe and G. Grassel, "Multimedia adaptation for the multimedia messaging service," IEEE Communications Magazine, vol. 42, No. 7, pp. 120-126, Jul. 2004.

Z. Lei and N.D. Georganas, "Accurate bit allocation and rate control for DCT domain video transcoding," in IEEE CCECE 2002. Canadian Conference on Electrical and Computer Engineering, vol. 2, pp. 968-973, 2002.

J. Ridge, "Efficient transform-domain size and resolution reduction of images," Signal Processing: Image Communication, vol. 18, No. 8, pp. 621-639, Sep. 2003.

Pigeon, S., Coulombe, S. "Very Low Cost Algorithms for Predicting the File Size of JPEG Images Subject to Changes of Quality Factor and Scaling" Data Compression Conference p. 528, 2008.

Pigeon, S., Coulombe, S. "Computationally Efficient Algorithms for Predicting the File Size of JPEG Images Subject to Changes of Quality Factor and Scaling" Proceedings of the 24th Queen's Biennial Symposium on Communications, Queen's University, Kingston, Canada, 2008.

S. Chandra and C. S. Ellis "JPEG Compression Metric as a Quality Aware Image Transcoding" Proceedings of USITS' 99: The 2nd USENIX Symposium on Internet Technologies and Systems, Boulder, Colorado, USA, Oct. 11-14, 1999.

A. Vetro, C. Christopoulos, and H. Sun, "Video transcoding architectures and techniques: an overview," IEEE Signal Processing Magazine, vol. 20, No. 2, pp. 18-29, Mar. 2003.

S. Grgi'C, M. Grgi'C, and M. Mrak, "Reliability of objective picture quality measures," Journal of Electrical Engineering, vol. 55, No. 1-2, pp. 3-10, 2004.

OMA Multimedia Messaging Service, Architecture Overview, Approved Version 1.2 01, published by Open Mobile Alliance, available from http://www.openmobilealliance.org/release_program/mms_v1_2.html Mar. 2005.

Wang, Z., Bovic, A., Rahim, H., Sheikh, Simoncelli, E. "Image Quality Assessment: From Error Visibility to Structural Similarity" IEEE Transactions on Image Processing, vol. 13, No. 4, pp. 600-612, Apr. 2004.

Lane, T., Gladstone, P., Ortiz, L., Boucher, J., Crocker L, Minguillon, J., Phillips, G., Rossi, D., Weijers, G., "The Independent JPEG Group Software Release 6b" 1998.

JPEG—Wikipedia, the free encyclopedia, http://en.wikipedia.org/wiki/JPEG, Aug. 5, 2007.

Avcibas, Ismail; Sankur, Bulent and Sayood, Khalid "Statistical Evaluation of Image Quality Measures" Journal of Electronic Imaging, vol. 11, No. 2, pp. 206-223, Apr. 2002.

Reed E C et al, "Optimal multidimensional bit-rate control for video communication", IEEE Transactions on Image Processing, vol. 11, No. 8, Aug. 1, 2002, pp. 873-885.

Ta-Peng Tan et al, "On the methods and application of arbitrarily downsizing video transcoding", Multimedia and Expo, 2002. ICME '02. Proceedings. 2002 IEEE International Conference on Lausanne, Switzerland Aug. 26-29, 2002, Piscataway, NJ, USA. IEEE US vol. 1, Aug. 26, 2002, pp. 609-612.

Haiyan Shu et al, "Frame Size Selection in Video Downsizing Transcoding Application", Conference Proceedings/IEEE International Symposium on Circuits and Systems (ISCAS): May 23-26, 2005, pp. 896-899.

Haiwei Sun et al, "Fast motion vector and bitrate re-estimation for arbitrary downsizing video transcoding", Proceedings of the 2003 International Symposium on Circuits and Systems (ISCAS), 2003. vol. 2, Jan. 1, 2003, pp. II-856.

Shu H et al, "The Realization of Arbitrary Downsizing Video Transcoding", IEEE Transaction on Circuits and Systems for Video Technology, IEEE Service Center, vol. 16, No. 4, Apr. 1, 2006, pp. 540-546.

Bruckstein A M et al, "Down-scaling for better transform compression", IEEE Transactions on Image Processing, vol. 12, No. 9, Sep. 1, 2003, pp. 1132-1144.

Wang D et al, "Towards Optimal Rate Control: A Study of the Impact of Spatial Resolution, Frame Rate, and Quantization on Subjective Video Quality and Bit Rate", Visual Communications and Image Processing, 2003, In Proceedings of SPIE, vol. 5150, Jul. 8, 2003, pp. 198-209.

Herman et al, "Nonlinearity Modelling of QoE for Video Streaming over Wireless and Mobile Network", Intelligent Systems, Modelling and Simulation (ISMS), 2011 Second International Conference on, IEEE, Jan. 25, 2011, pp. 313-317.

\* cited by examiner

SYSTEM AND METHOD FOR PREDICTING THE FILE SIZE OF IMAGES SUBJECT TO TRANSFORMATION BY SCALING AND A CHANGE OF QUALITY-CONTROLLING PARAMETERS

FIELD OF THE INVENTION

The present invention generally relates to image transcoding. More specifically, the present invention is concerned with a system and method for predicting the file size of images subject to transformation by scaling and a change of quality-controlling parameters.

BACKGROUND OF THE INVENTION

Nowadays, the heterogeneous nature of mobile terminals, electronic devices, communications and multimedia applications renders multimedia transcoding inevitable. For example, in the emerging Multimedia Messaging Service (MMS), server-end adaptation is necessary to ensure interoperability when the destination mobile terminal cannot handle the received media under its current format. Image-related interoperability problems mainly originate from excessive resolution or file size. Accordingly, image transcoding operations commonly involve image scaling and file size reduction.

Although reducing the resolution of an image is a well-known and deterministic problem, reducing efficiently the compressed file size of an image in order to meet a given target remains a challenge. For example, in the lossy JPEG (Joint Photographic Experts Group) format, the user typically controls a quality factor (QF), which affects the quantization process and therefore the compressed file size. Indeed, a higher QF leads to a better image quality and a larger file size. However, a precise relationship between the QF and the compressed file size still lacks, since other image properties must also be taken into consideration when establishing the relationship between the QF and the compressed file size.

A simple transcoding approach for file size reduction of an image may consist of decoding the image and then iteratively re-encoding the image with a different QF value until the given target size is met, within acceptable tolerance. Although functional, this approach is highly inefficient in terms of computations and is not acceptable for high volume image transcoding servers.

Several studies have investigated the relationship between quantization and file size, or the bitrate. Although these studies provide interesting results, they are difficult to implement in the proposed context of predicting a JPEG image file size subject to transformation by scaling and a change of QF value, because many assumptions do not hold. For example, most of the studies start from an original, artefact-free image. Also some of these studies were made in the context of MPEG video coding, which uses a simpler quantization scheme than JPEG. More importantly, these studies ignore scaling of the image as a bona fide adaptation strategy. The impact of these differences with the proposed context will be discussed herein below.

Furthermore, interesting methods have been proposed to address the specific problem of JPEG size adaptation (see for example U.S. Pat. No. 6,233,359 B1 granted to Ratnakar et al on May 15, 2001 and the article "Efficient transform-domain size and resolution reduction of images", by J. Ridge, Signal Processing: Image communication, 18(8):621-639, September 2003"). As discussed in the article of J. Ridge, the method of U.S. Pat. No. 6,233,359 B1 addresses complexity more than user experience and, also, this method is prone to under-shooting file sizes, which represent two major shortcomings. Even though the method of J. Ridge provides much better results than the method disclosed in U.S. Pat. No. 6,233,359 B1, these two methods still have major drawbacks or limitations, in particular their non-treatment of scaling as a file size reduction strategy, so that there is a need to further investigate and improve the existing methods.

For example, the existing algorithms first require that some image statistics be gathered. By so doing, not only the complexity of the process is increased but also some level of re-engineering of the image compression tools is required, so that the JPEG encoder/decoder software has to become a specialized transcoder.

Secondly, those algorithms consider the resolution of the image as fixed, or independently altered in a previous stage, and focus solely on file size reduction. However, the study of the impact of changes in both quality-controlling parameters and scaling appears to be a necessity. Indeed, this will be useful so as to select the best combination of scaling and QF values which will meet terminal constraints. In particular, it is often better to have a lower resolution, high quality image than a high-resolution image with poor quality.

OBJECT OF THE INVENTION

An object of the present invention is to provide a system and method for predicting a file size of an image subject to transformation by scaling and changes of quality-controlling parameters, these system and method capable of overcoming the above discussed problems and drawbacks.

SUMMARY OF THE INVENTION

More specifically, in accordance with the present invention, there is provided a method for predicting a file size of an image subject to transformation by scaling and a change of at least one quality-controlling parameter, comprising: receiving (a) the file size of the image before transformation of the image, (b) information about at least one quality-controlling parameter of the image before transformation of the image, (c) information about at least one quality-controlling parameter for application to the image during transformation of the image, and (d) a scaling factor for application to the image during transformation of the image; calculating a relative file size prediction on the basis of the received information about quality-controlling parameters and scaling factor; and calculating a file size prediction of the image after transformation of the image, wherein the file size prediction of the image after transformation of the image is calculated as a function of the file size of the image before transformation of the image and the calculated relative file size prediction.

The present invention also relates to a system for predicting a file size of an image subject to transformation by scaling and a change of at least one quality-controlling parameter, comprising: an input for receiving (a) the file size of the image before transformation of the image, (b) information about at least one quality-controlling parameter of the image before transformation of the image, (c) information about at least one quality-controlling parameter for application to the image during transformation of the image, and (d) a scaling factor for application to the image during transformation of the image; a calculator of a relative file size prediction on the basis of the received information about quality-controlling parameters and scaling factor; and a calculator of a file size prediction of the image after transformation of the image, wherein the file size prediction of the image after transformation of the image is calculated as a function of the file size of the image before transformation of the image and the calculated relative file size prediction.

The foregoing and other objects, advantages and features of the present invention will become more apparent upon reading of the following non-restrictive description of illustrative embodiments thereof, given by way of example only with reference to the accompanying drawings.

DETAILED DESCRIPTION

Figure 1:
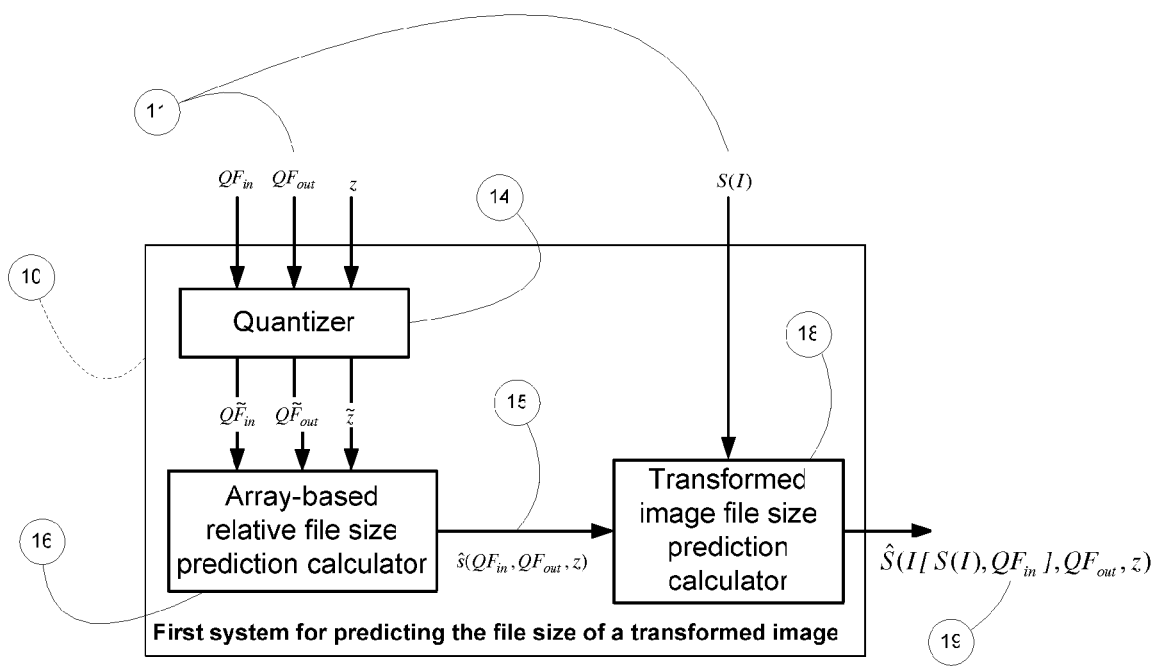
FIG. 1 is a schematic block diagram of a first system for predicting the file size of an image subject to transformation by scaling and a change of quality-controlling parameter, in accordance with a first non-restrictive, illustrative embodiment of the present invention.

Generally stated, a system and method according to the non-restrictive illustrative embodiments of the present invention will predict the file size of an image, which has already been compressed and which is subject to transformations by both scaling and changes of quality-controlling parameters.

Also, although the system and method according to the non-restrictive illustrative embodiments will predict the file size of a JPEG image subject to transformation by scaling and a change of at least one quality-controlling parameter, in this case the QF (Quality Factor), it should be kept in mind that the same concepts can be applied to other types of formats such as GIF (Graphics Interchange Format) as well as other image formats that have other quality-controlling parameters such as the number of colors, the color depth, the color component sampling structure (4:4:4, 4:2:2, 4:2:0, etc), horizontal and vertical resolutions, subsampling factors, etc. This invention is mostly described with one quality-controlling parameter for clarity and to help keeping the description simple but it extends to many quality controlling-parameters; this will be explained in more detail hereinafter.

The system and method according to the non-restrictive illustrative embodiments of the present invention will also select a proper combination of scaling and QF that meets a certain size constraint. Furthermore, in order to minimize processing complexity, the system for the prediction of the file size, hereinafter referred to as predictor of file size, uses values which are readily available and easily accessible from the image.

However, before further defining the predictor of file size, the concept of training and testing image corpus will be described.

For the purpose of testing a predictor of file size and/or a file size prediction method, a corpus of images is used. A useful corpus is formed of a collection of exemplars—in our case, images—representative of the population to be studied. Currently, typical JPEG databases are not widely available; therefore, one has to build his/her own database or image corpus. For example, images can be gathered from the Internet to form the image corpus. Indeed, a crawler can easily follow links starting from popular web pages, which ensures trendiness, and then grab any image media that it comes across. Furthermore, anonymization and uniqueness of the images in the image corpus can be ensured by renaming files using unique identifiers, for example identifiers generated by strong hash functions such as MD5 (Message Digest 5) applied to the entire files. Also, collisions can be safely ignored. A strong hash function, such as MD5, computes a digital signature from a document which can then be reliably used to identify the document for which it has been computed. Very strong hash functions like MD5 are extremely unlikely to produce the same digital signature for two different documents, thus enabling a very reliable method of detecting identical files.

In addition, the image corpus is divided into two random disjoint sets: a training set of images and a test set of images. The training set contains images used to optimize the model and method of prediction, while the test set is used to actually test the optimized model and method of prediction. Since the corpus presents a rather limited number of exemplars, new exemplars are generated by applying a large number of possible transformations, both in quality-controlling-parameters and in scaling, whereby the model can be populated with a much greater and useful exemplar population.

Currently used image file size prediction systems and methods, such as i) polynomial prediction and ii) ρ-domain prediction systems and methods will now be described.

i) Polynomial Prediction

Polynomial prediction uses a low order polynomial in order to formulate a prediction. If computing a polynomial fit on one-dimensional data is a simple task, however, adding more variables to the fit increases exponentially the number of points that need to be computed. Indeed, if the technique from Lin et al. (Article "*Rate control using spline-interpolated R-D characteristics*", in Procs. VCIP'96, pages 111-122, 1996) is generalized to use a polynomial of order d in n variables, then, there is a need to solve $(d+1)^n$ equations in $(d+1)^n$ unknowns. For each of these $(d+1)^n$ equations a point on the curve needs to be evaluated. With the method proposed by Lin et al., this means that a partial transcoding for each point needs to be performed, which results in an unacceptable amount of computation.

Furthermore, it is unclear what is the optimal order d of the polynomial (or even if it is a polynomial at all) and what n variables should be included in the prediction. At least the scaling and the desired output quality factor $QF_{out}$ should be used to formulate a prediction; the input quality factor $QF_{in}$ is implicit in the image itself and, therefore, participates to the computation when the $(d+1)^n$ points are computed. Because this procedure is computationally prohibitive, it was decided not to study its behavior in depth.

It should be noted that QPs (Quantization Parameters) and QFs (Quality Factors) are inversely related. A high QP means a more aggressive quantization while a high QF means higher quality and therefore less aggressive quantization. QPs are directly related to quantization in schemes such as those used in Standard H.263. However, in JPEG, QFs are related to quantization through two successive steps: a first step in which a piecewise transfer function is used and a second step in which a quantization matrix is used. The quantization matrix scales the DCT (Discrete Cosine Transform) coefficients before encoding. It should be pointed out that, in the present specification, QF refers to the JPEG quality factor, as understood by the Independent JPEG Group (IJG).

ii) ρ-Domain Prediction

In ρ-domain prediction, an accurate prediction of the bitrate is calculated based on an estimate of the number of zeros resulting from quantization.

In ρ-domain prediction, it is assumed that i) the image is never resized, ii) the target bitrates are very low, and iii) the original images are available to the compressor. In the context of Standard H.263, the first two assumptions i) and ii) can be validated. However, assuming that the original images are available to the compressor (assumption iii)) is not valid in the context of image adaptation and transcoding; as mentioned hereinabove, original and raw images are generally not available to the transcoding engines.

ρ-domain prediction uses the cruder quantization of Standard H.263. JPEG uses a quantization matrix that can be customized, while Standard H.263 uses a simpler uniform quantizer. The additional complexity introduced by the quantization matrix renders the model of ρ-domain prediction less amenable to JPEG adaptation.

Figure 7A:
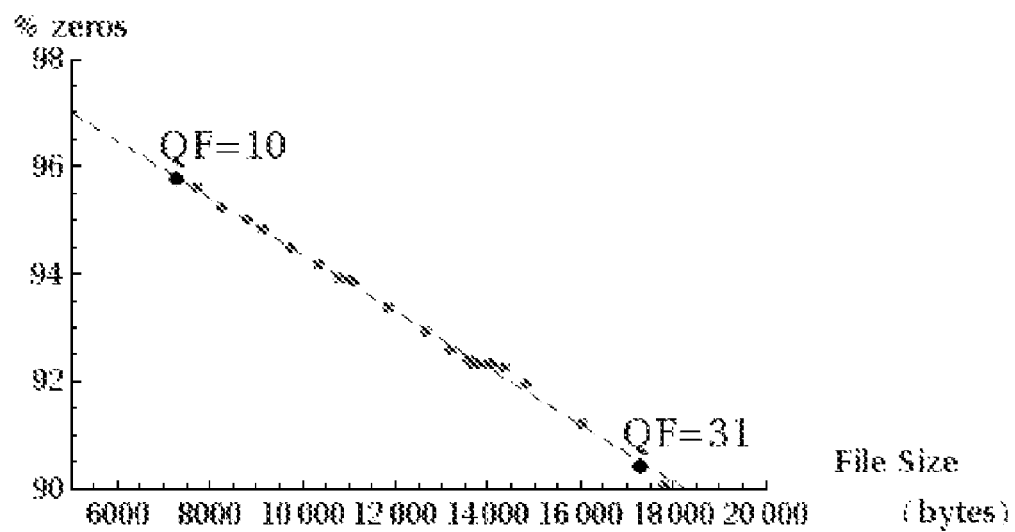
FIGS. 7a and 7b are graphs showing the percentage of zeros as a function of the file size (bytes).
Figure 7B:
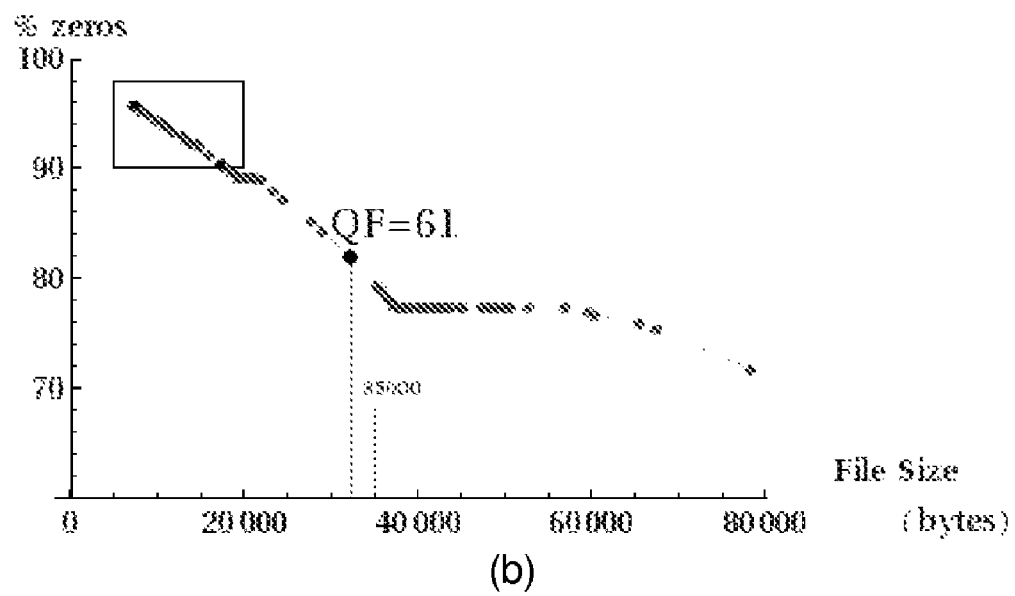
Figure 1:
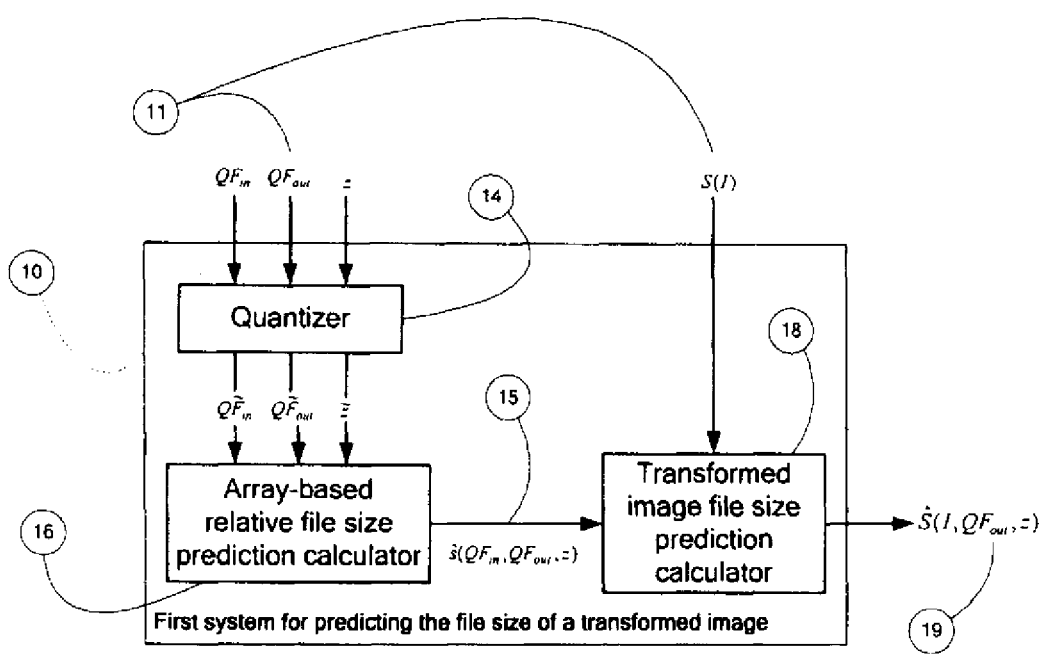
Figure 2:
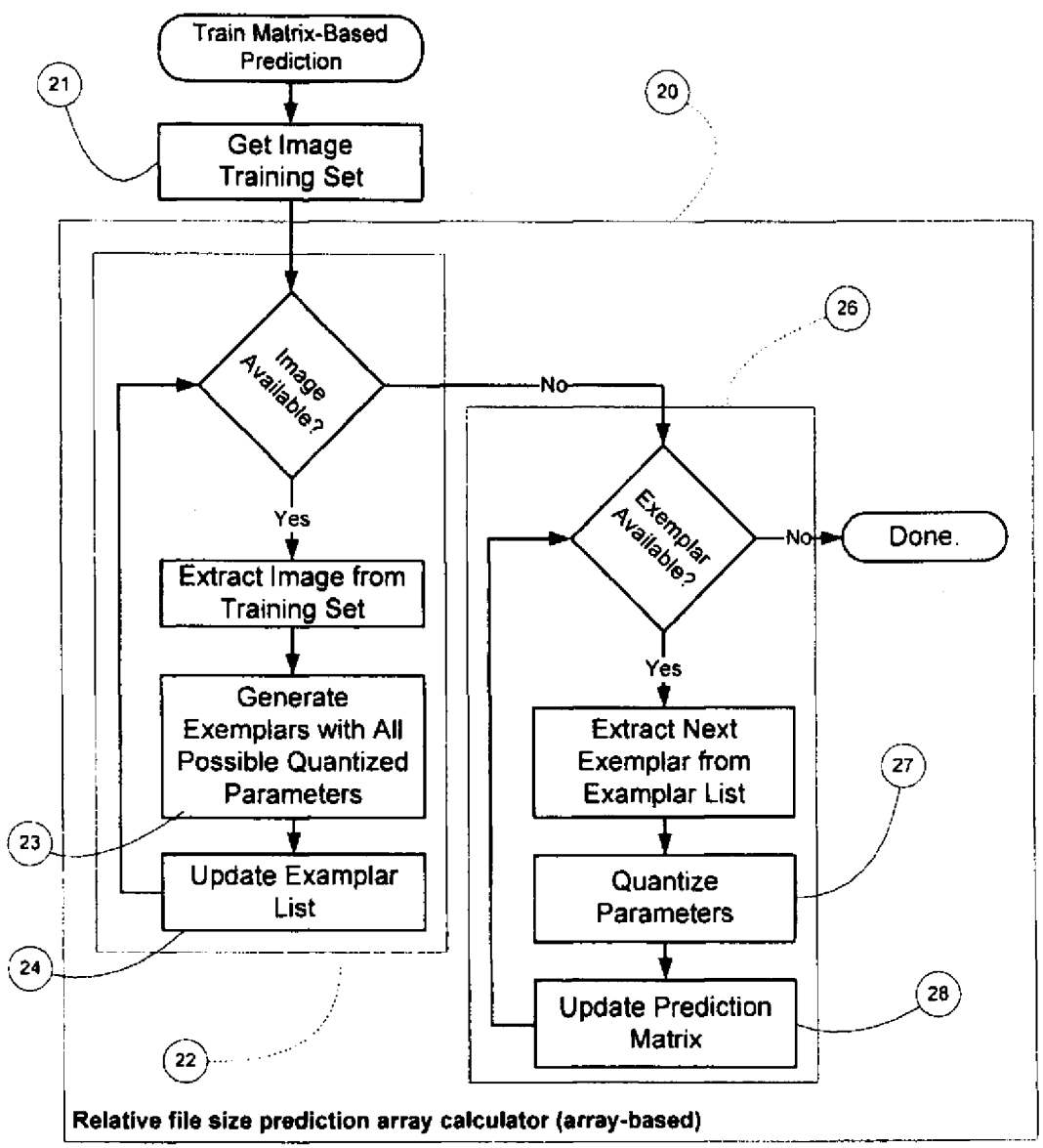

FIGS. 7a and 7b show that a predictor according to ρ-domain prediction is linear within a region of very low QFs. More specifically, the number of zeros varies linearly with bitrate but at low bitrates only. However, linearity is lost if broader ranges of bitrates are considered, as shown in FIG. 7b. Also, very low QFs are not acceptable for still picture coding using JPEG because they lead to artifacts and poor perceived image quality. When maximizing the user experience, the highest possible QF should be considered while meeting file size constraints.

Furthermore, ρ-domain prediction is expensive, in terms of computation, and supposes a different range of quantization parameter values.

Not only polynomial prediction and ρ-domain prediction are rather complex, they also present drawbacks. First, polynomial prediction and ρ-domain prediction make assumptions that, often, do not hold in transcoding, such as using an original image. Secondly, polynomial prediction and ρ-domain prediction ignore the operation of scaling for reducing the file size. Therefore, their estimation does not lead to a joint estimation of scaling and QF reduction. ρ-domain prediction assumes that, when scaling happens, it happens before the transcoded file size prediction, which does not allow one to formulate an adaptation strategy for file size reduction based on both scaling and quality factor. Polynomial prediction can, theoretically, include scaling as well, but the computational cost of doing so is prohibitive, as the number of transcoding needed grows exponentially with the number of variables used. Ignoring scaling as an adaptation strategy is a major shortcoming since it may well be that, in order to maximize the user experience, an image is to be scaled down and encoded with a higher QF rather than just being recompressed with a lower QF. Thus, a predictor of file size should be able to take into consideration scaling as well as, in addition, QF changes.

Furthermore, it would be interesting to obtain a predictor of file size that does not use image data besides the width, height, scaling and QF of the image. Also, the predictor of file size should be able to use information about other images so as to formulate a prediction about the present image. Therefore, non-parametric methods would be advantageously used.

Non-parametric modeling differs from parametric modeling in the number of internal parameters which is usually rather large and that these parameters are loosely organized so as to enable the discovery of structure. On the contrary, parametric modeling uses a fixed and small number of parameters, each assigned with very specific role by a priori assumptions.

1. First Transformed Image File Size Predictor

Generally stated, a predictor of file size according to a first non-restrictive illustrative embodiment of the present invention predicts the file size of an image subject to transformation by scaling and a change of quality factor by considering the compressed file size of the image before transformation of that image multiplied by a certain prediction factor, referred hereinafter as the relative file size prediction.

Turning now to FIG. 1, a predictor of file size 10 according to the first non-restrictive, illustrative embodiment of the present invention will be described. The predictor of file size 10 is generally used in a transcoding engine (not shown). However, it is within the scope of the present invention to use the predictor of file size 10 in devices other than transcoding engines, for example in encoders and decoders, etc.

In transcoding, media characteristics such as the type of media, the resolution, etc., are typically used to determine if adaptation is needed. Those parameters can usually be obtained without decompressing a compressed media. For example, scanning the file header of the compressed media is often sufficient. In a predictor of file size, using parameters based on metrics that require decompression of the compressed image or any pixel-level computations is very expensive in terms of computations and requires almost the same time and power of processing as actual transcoding. Therefore, parameters of this type are avoided.

Characterization data are used as inputs to the predictor of file size 10. For example, in the case of JPEG images, the characterization data could be the resolution, such as the width and height of the image, the quality factor QF, the subsampling method, or any other information readily available from the image.

In the first non-restrictive, illustrative embodiment of the present invention as illustrated in FIG. 1, the predictor of file size 10 is supplied as inputs 11 with i) the file size S(I) of the image I before transformation of that image, ii) the original quality factor $QF_{in}$ of the image I before transformation, iii) the desired output quality factor $QF_{out}$ for application to the image during transformation and iv) a scaling factor (zoom factor) z for application to the image during transformation, with $0 < z \leq 1$.

Referring to FIG. 1, the predictor of file size 10 comprises a quantizer 14 for quantizing the original quality factor $QF_{in}$, the output quality factor $QF_{out}$ and the scaling factor z to obtain quantized quality factors $Q\tilde{F}_{in}, Q\tilde{F}_{out}$ and a quantized scaling factor $\tilde{z}$. Quantizers are well known to those of ordinary skill in the art and, therefore, will not be further described in the present specification.

The predictor of file size 10 also includes an array-based, relative file size prediction calculator 16 for pre-computing relative file size predictions, based on a prediction array which will be described hereinbelow. This yields the prediction function $\hat{s}(QF_{in}, QF_{out}, z)$ 15, which gives a relative compressed file size prediction of the image I to which the desired output quality factor $QF_{out}$ and the scaling factor (zoom factor) z have been applied.

Finally, the predictor of file size 10 comprises a transformed image file size prediction calculator 18 supplied with the compressed file size S(I) of the image I before transformation of that image and the prediction function ŝ(QF$_{in}$, QF$_{out}$,z) to compute a file size prediction 19 Ŝ(I[S(I),QF$_{in}$], QF$_{out}$,z) of the image I after transformation (image J) as follows:

$$\hat{S}(I, QF_{out}, z) = \hat{S}(I[S(I), QF_{in}], QF_{out}, z) = S(I)\hat{s}(QF_{in}, QF_{out}, z) \quad (1)$$

where the function ŝ( ) is the relative size prediction, which is given by:

$$\hat{s}(QF_{in}, QF_{out}, z) = \frac{1}{|T_{QF(I)}|} \sum_{J \in T_{QF}(I)} s(J, QF_{out}, z) \quad (2)$$

yielding output 19 of FIG. 1.

The function s(J,QF$_{out}$,z) represents the exact function of the file size of the transformed image J, with the desired QF$_{out}$ and scaling z. The function is given by:

$$s(J, QF_{out}, z) = \frac{S(T(J, QF_{out}, z))}{S(J)} \quad (3)$$

where S(J) is the compressed file size of the transformed image J and T(J,QF$_{out}$,z) is the function that returns the compressed, transformed image J after it is applied both scaling z and the change of quality factor to QF$_{out}$. The expression S(T( )) is the compressed file size function related to the transformed image J using the desired output quality factor QF$_{out}$ and the scaling factor z.

It should be noted that T$_{QF(I)}$ ⊆ T is the subset of images having the same QF as the image I in the training set T and |T$_{QF(I)}$| is the cardinality of the subset T$_{QF(I)}$. And the function T( ) can be, for example, a complete JPEG transcoder.

Also, it should be noted that ŝ( ) represents an optimal least mean square estimator. Indeed, it can be readily verified that:

$$\hat{s}(QF_{in}, QF_{out}, z) = \arg\min_{\hat{s}} \sum_{J \in T_{QF(I)}} (s(J, QF_{out}, z) - \hat{s})^2 \quad (4)$$

However, since the function ŝ( ) is expensive in terms of computation, an array of relative file size predictions can be pre-compute using that function so as alleviate the computational complexity. Therefore, the relative file size prediction calculator 16 is used with an array M of pre-computed file size predictions whose indexes are the quantized quality factor Q$\tilde{F}_{in}$ of the image before transformation of the image, the desired quality factor Q$\tilde{F}_{out}$ for application during transformation of the image, and the scaling factor z̃ for application during transformation of the image. Quantized values are denoted by the tilde ( ) symbol.

Suitable quantization will prevent context dilution while allowing the array M to be searched efficiently. The values can be quantized through a conventional quantizer (not shown). Since quantizers are well-known to those of ordinary skill in the art, they will not be further described in the present specification.

As indicated hereinabove, the inputs of the array-based relative size prediction calculator 16 comprise the quantized quality factor Q$\tilde{F}_{in}$ of the image before transformation of the image, the desired quantized output quality factor Q$\tilde{F}_{out}$ of the image during transformation of the image and the quantized scaling factor z̃ for application during transformation of the image and the array-based relative file size prediction calculator 16 comprises a relative file size prediction array calculator (not shown) supplied with these inputs to pre-compute an array of relative file size predictions. An entry of the array M is given by the following equation:

$$M_{Q\tilde{F}_{in}, Q\tilde{F}_{out}, \tilde{z}} = \frac{1}{|S_{Q\tilde{F}_{in}, Q\tilde{F}_{out}, \tilde{z}}|} \sum_{J \in S_{Q\tilde{F}_{in}, Q\tilde{F}_{out}, \tilde{z}}} s(J, QF_{out}(J), z(J)) \quad (5)$$

where QF$_{out}$(J),z(J) are functions that return the QF used during the transformation, or QF$_{out}$, and the scaling factor z, respectively. The function s(J,QF$_{out}$(J),z(J)) (Equation (5)) returns the observed relative file size change when the transformed image J is applied the given transformation. The set S$_{Q\tilde{F}_{in}, Q\tilde{F}_{out}, \tilde{z}}$ represent a set of cardinalities |S$_{Q\tilde{F}_{in}, Q\tilde{F}_{out}, \tilde{z}}$| of all images with quality factors and scaling factors that fall within the corresponding quantization cells. A quantization cell is the set of all values that quantize to a same given value. By the cells S$_{Q\tilde{F}_{in}}$,S$_{Q\tilde{F}_{out}}$,S$_{\tilde{z}}$, it is meant the set of all values of QF$_{in}$, QF$_{out}$ and z that quantize to S$_{Q\tilde{F}_{in}}$,S$_{Q\tilde{F}_{out}}$,S$_{\tilde{z}}$, respectively. Here, S$_{Q\tilde{F}_{in}, Q\tilde{F}_{out}, \tilde{z}}$ is a set of images having values for QF$_{in}$ which contains all the images of a collection of images having the same original quality factor quantized to Q$\tilde{F}_{in}$, the values for the output quality factor QF$_{out}$ quantized to Q$\tilde{F}_{out}$, and the values for the scaling factor z quantized to z̃ (that is the intersection of the three sets S$_{Q\tilde{F}_{in}}$,S$_{Q\tilde{F}_{out}}$,S$_{\tilde{z}}$). If more quality-controlling parameters (beyond QF) were used, they would be quantized as well in a parameter-specific appropriate manner and used as yet more dimensions to the prediction array. The function s( ) is the exact relative file size prediction observed when the image J was transformed.

Accordingly, M$_{Q\tilde{F}_{in}}$ denotes a slice of the array M, i.e. an array with indices Q$\tilde{F}_{out}$ and z̃. For example, the array M$_{80}$, optimized from the image training set T is shown in Table 1.

TABLE 1

| | | Relative File Size Prediction | | | | | | | | | |
|---|---|---|---|---|---|---|---|---|---|---|---|
| | | Scaling, z | | | | | | | | | |
| | | 10% | 20% | 30% | 40% | 50% | 60% | 70% | 80% | 90% | 100% |
| Q$\tilde{F}_{out}$ | 10 | 0.03 | 0.04 | 0.05 | 0.07 | 0.08 | 0.10 | 0.12 | 0.15 | 0.17 | 0.20 |
| | 20 | 0.03 | 0.05 | 0.07 | 0.09 | 0.12 | 0.15 | 0.19 | 0.22 | 0.26 | 0.32 |
| | 30 | 0.04 | 0.05 | 0.08 | 0.11 | 0.15 | 0.19 | 0.24 | 0.29 | 0.34 | 0.41 |
| | 40 | 0.04 | 0.06 | 0.09 | 0.13 | 0.17 | 0.22 | 0.28 | 0.34 | 0.40 | 0.50 |
| | 50 | 0.04 | 0.06 | 0.10 | 0.14 | 0.19 | 0.25 | 0.32 | 0.39 | 0.46 | 0.54 |
| | 60 | 0.04 | 0.07 | 0.11 | 0.16 | 0.22 | 0.28 | 0.36 | 0.44 | 0.53 | 0.71 |
| | 70 | 0.04 | 0.08 | 0.13 | 0.18 | 0.25 | 0.33 | 0.42 | 0.52 | 0.63 | 0.85 |

TABLE 1-continued

Relative File Size Prediction

| | Scaling, z | | | | | | | | | |
|---|---|---|---|---|---|---|---|---|---|---|
| | 10% | 20% | 30% | 40% | 50% | 60% | 70% | 80% | 90% | 100% |
| 80 | 0.05 | 0.09 | 0.15 | 0.22 | 0.31 | 0.41 | 0.52 | 0.65 | 0.76 | 0.95 |
| 90 | 0.06 | 0.12 | 0.21 | 0.31 | 0.44 | 0.59 | 0.75 | 0.93 | 1.12 | 1.12 |
| 100 | 0.10 | 0.24 | 0.47 | 0.75 | 1.05 | 1.46 | 1.89 | 2.34 | 2.86 | 2.22 |

The array-based relative size prediction calculator 18 of the predictor or file size 10 is responsive to the relative file size prediction ŝ( ) and the file size S(I) of the image I before transformation of the image to calculate the predicted file size 19 of the image I after transformation (image J) using the transformed image file size prediction calculator 18 as follows:

$$\hat{S}(I, QF_{out}, z) = (\hat{S}(I[S(I), QF_{in}], QF_{out}, z) = S(I) M_{Q\tilde{F}_{in}, Q\tilde{F}_{out}, \tilde{z}}$$ (6)

It should be pointed out that the function S(I) embeds some of the information about the image I that other systems and methods extract explicitly at larger cost, in terms of computation. S(I) can be thought of as a hash function of the image I that retains information about the characteristics of the image and injects them into the transformed image file size prediction calculator 18.

The predictor of file size 10 according to the first non-restrictive illustrative embodiment is a non-parametric predictor.

2. First Array Calculator and Training Method

Figure 2:
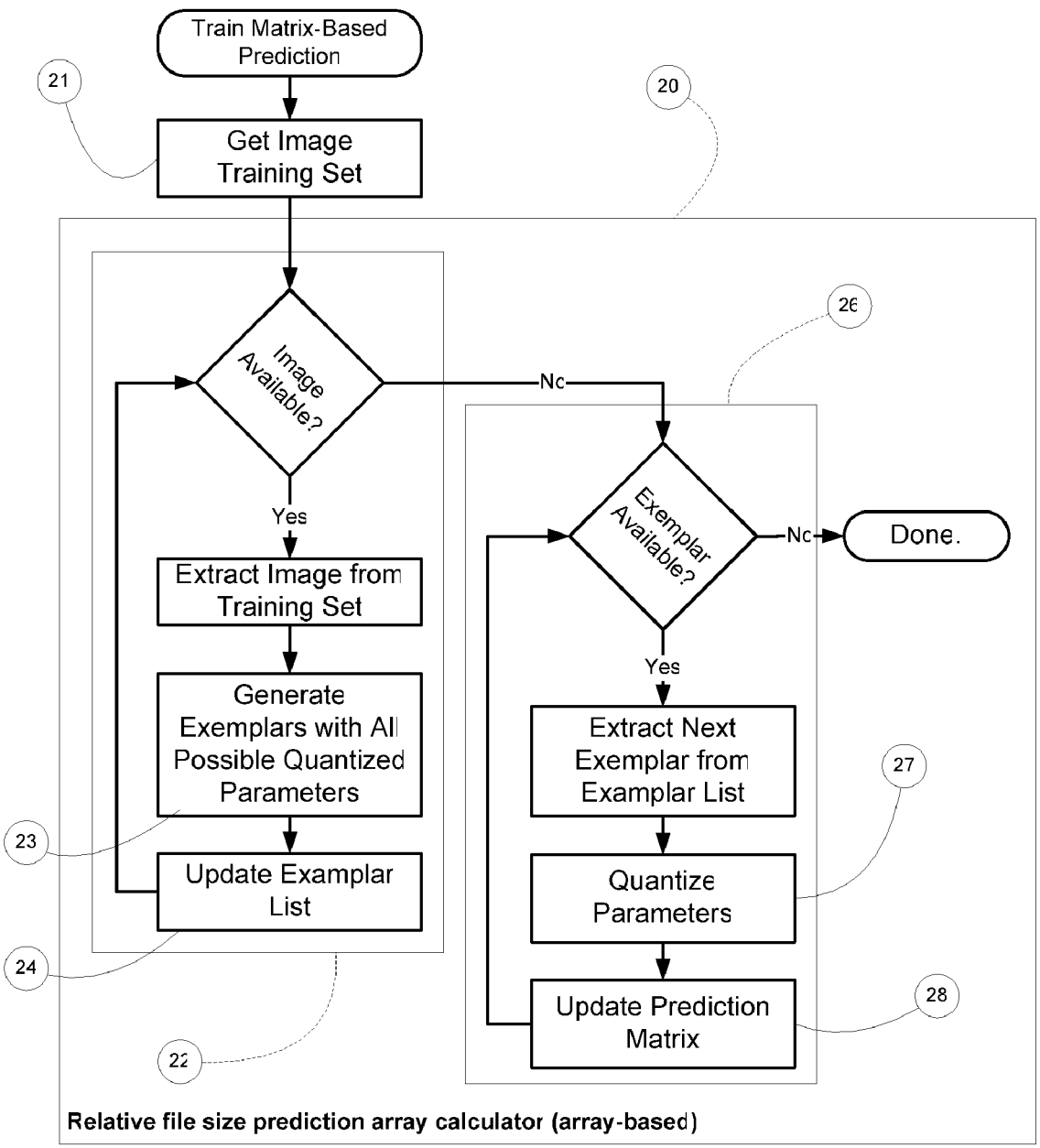
FIG. 2 is a flow chart illustrating the training phase of a first method (corresponding to the first system of FIG. 1) for predicting the file size of an image subject to transformation by scaling and a change of quality-controlling parameter, in accordance with the first non-restrictive, illustrative embodiment of the present invention.

Turning now to FIG. 2, the training phase of the array-based relative file size prediction calculator 20 according to the first method is described. Such a method can be implemented for the predictor of relative file size 10.

In operation 21, an image corpus is acquired. The means for such acquisition is beyond the scope of the present specification, but a non-restrictive illustrative embodiment is a web crawler or any other means of conducting a reliable survey of images existent. Images obtained on-the-fly by a transcoder can also be used for training.

In operation 22, each image in the corpus is used to generate any desired number of exemplars. In sub-operation 23 a large number of images on which were applied quality-controlling parameters changes and scaling, typically in a way that is compatible with the quantization scheme used in the predictor of file size 10 is generated from an image extracted from the corpus. With each exemplar are stored its quality factor $QF_{in}$, quality factor $QF_{out}$ and scaling factor z.

In sub-operation 24, each of the generated exemplar is added to the exemplar list that also includes the original images from the corpus. Operation 22 is repeated as long as there are images left unprocessed in the corpus.

In operation 26, the array M is computed. Each exemplar generated in operation 22 is now processed to compute the array M.

In sub-operation 27, data extracted from a given exemplar is quantized. The values of its quality factor $QF_{in}$, quality factor $QF_{out}$ and scaling factor z are quantized to $Q\tilde{F}_{in}$, $Q\tilde{F}_{out}$, and $\tilde{z}$.

In sub-operation 28, the quantized quality factors $Q\tilde{F}_{in}$ and $Q\tilde{F}_{out}$, and the quantized scaling factor $\tilde{z}$ are used to update the array M.

After operation 26, the array M contains the relative file size prediction for all images. According to equation (5):

$$M_{Q\tilde{F}_{in}, Q\tilde{F}_{out}, \tilde{z}} = \frac{1}{|S_{Q\tilde{F}_{in}, Q\tilde{F}_{out}, \tilde{z}}|} \sum_{J \in S_{Q\tilde{F}_{in}, Q\tilde{F}_{out}, \tilde{z}}} s(J, QF_{out}(J), z(J))$$

where s( ) is calculated according to Equation (3). $S_{Q\tilde{F}_{in}}$ is a subset of all images having the same quantized quality factor as $Q\tilde{F}_{in}$. $S_{Q\tilde{F}_{out}}$ is the subset of all the images having the same quantized output quality factor as $Q\tilde{F}_{out}$. $S_{\tilde{z}}$ is the subset of all the images having the same quantized scaling factor as $\tilde{z}$. $S_{Q\tilde{F}_{in}, Q\tilde{F}_{out}, \tilde{z}}$ is the intersection of these three sets as described in equation (5).

The array-based relative file size prediction calculator 20 of FIG. 2 is time adaptive. For example, for updating the prediction, it is possible to add a new exemplar in Equation (2), that is, going through sub-operations 27 and 28 only. It can also be made trend adaptive by removing the oldest exemplars from the prediction set. Fortunately, when doing so, no storage of the images is required; only the transform values (quality factor and scaling factor), timestamp, and the relative file size after transformation of the image need to be stored.

It should be noted that the update time in the array-based relative file size prediction calculator 20 of FIG. 2 is of order O(1). By O(1), it is meant that the number of operations needed to update the the array-based relative file size prediction calculator 20 is constant, i.e. it doesn't depend on the number of images in the training set.

3. First Set of Numerical Examples

Experiments have been carried out using the predictor of file size 10 of FIG. 1 and the relative file size prediction array calculator 20 of FIG. 2. The results are presented in the above Table 1. For example, Table 1 shows the array $M_{8\tilde{0}}$, optimized from the image training set and calculated according to equation (5).

The corpus used in the simulations contained 70,300 JPEG files. The corpus was free from corrupted files and all metadata, such as EXIF tags, are removed. EXIF is a common extension to many image formats, including JPEG, that holds extra information about the picture or image, especially when originating from a digital camera. EXIF extensions are used to store data such as exposure details, color balance, camera brand name, and other digital photography information. For each original exemplar (image) in the corpus, 100 (one hundred) exemplars were generated using different quality factors $QF_{out}$ and scaling factors z. The split between the training set and the test set is about 80/20.

Table 2 shows the expected absolute error $E\lfloor |S(I_{out}) - \hat{S}(I_{out})|/S(I_{out})\rfloor \times 100\%$ for the prediction array $M_{8\tilde{0}}$. It can be seen that the prediction error is minimal around $Q\tilde{F}_{in} = Q\tilde{F}_{out} = 80$ and $\tilde{z} = 100\%$. The prediction error is maximal when $Q\tilde{F}_{in}$ and $Q\tilde{F}_{out}$ and scaling factor differ the most, for example at the upper left of Table 2. Also, the portion of Table 2 which is in gray represents the region of expected absolute errors of 10% or less.

TABLE 2

Expected Relative File Size Prediction Error

| | | \multicolumn{10}{c}{Scaling, %} | | | | | | | | | |
|---|---|---|---|---|---|---|---|---|---|---|---|
| | | 10% | 20% | 30% | 40% | 50% | 60% | 70% | 80% | 90% | 100% |
| QF$_{out}$ | 10 | 112.93 | 69.63 | 48.51 | 36.74 | 28.96 | 24.75 | 21.36 | 18.90 | 17.22 | 15.70 |
| | 20 | 92.75 | 52.81 | 35.78 | 26.65 | 20.53 | 17.52 | 14.93 | 12.97 | 11.63 | 10.23 |
| | 30 | 82.23 | 44.89 | 30.09 | 22.07 | 16.77 | 14.22 | 11.90 | 10.22 | 8.92 | 7.55 |
| | 40 | 75.74 | 40.34 | 26.84 | 19.52 | 14.64 | 12.32 | 10.15 | 8.57 | 7.27 | 6.45 |
| | 50 | 70.74 | 36.99 | 24.49 | 17.70 | 13.11 | 10.96 | 8.88 | 7.36 | 6.04 | 6.32 |
| | 60 | 66.28 | 34.14 | 22.48 | 16.19 | 11.82 | 9.84 | 7.81 | 6.36 | 5.00 | 2.40 |
| | 70 | 60.75 | 30.69 | 20.14 | 14.46 | 10.42 | 8.57 | 6.61 | 5.30 | 4.05 | 2.40 |
| | 80 | 54.08 | 26.83 | 17.56 | 12.65 | 8.97 | 7.33 | 5.55 | 4.50 | 3.53 | 3.43 |
| | 90 | 44.44 | 21.69 | 14.64 | 10.83 | 7.89 | 6.72 | 5.72 | 5.22 | 4.89 | 2.88 |
| | 100 | 28.84 | 18.59 | 16.62 | 16.17 | 15.39 | 15.01 | 14.70 | 14.06 | 13.90 | 8.39 |

Table 3 gives the probabilities that the absolute relative error is under a certain threshold $\beta$, for typical quality factors such as $Q\tilde{F}_{in} = Q\tilde{F}_{out} = 80$. The probabilities are given by:

$$P(|S(I_{out}) - \hat{S}(I_{out})| < \beta S(I_{out}) | \tilde{z}, Q\tilde{F}_{in}=80, Q\tilde{F}_{out}=80) \quad (7)$$

for different $\beta$ and $\tilde{z}$.

TABLE 3

$P(|\hat{S}(I_{out}) - S(I_{out})| < \beta S(I_{out}))$

| | | \multicolumn{10}{c}{Scaling} | | | | | | | | | |
|---|---|---|---|---|---|---|---|---|---|---|---|
| | | 10% | 20% | 30% | 40% | 50% | 60% | 70% | 80% | 90% | 100% |
| $\beta$ | 0.1 | 0.09 | 0.22 | 0.36 | 0.49 | 0.66 | 0.75 | 0.87 | 0.92 | 0.94 | 0.97 |
| | 0.2 | 0.20 | 0.48 | 0.68 | 0.82 | 0.92 | 0.96 | 0.98 | 0.99 | 1.00 | 1.00 |
| | 0.3 | 0.36 | 0.68 | 0.85 | 0.94 | 0.97 | 1.00 | 1.00 | 1.00 | 1.00 | 1.00 |
| | 0.4 | 0.51 | 0.81 | 0.92 | 0.97 | 0.99 | 1.00 | 1.00 | 1.00 | 1.00 | 1.00 |
| | 0.5 | 0.63 | 0.88 | 0.96 | 0.99 | 0.99 | 1.00 | 1.00 | 1.00 | 1.00 | 1.00 |
| | 0.6 | 0.70 | 0.92 | 0.98 | 0.99 | 1.00 | 1.00 | 1.00 | 1.00 | 1.00 | 1.00 |
| | 0.7 | 0.75 | 0.95 | 0.98 | 1.00 | 1.00 | 1.00 | 1.00 | 1.00 | 1.00 | 1.00 |
| | 0.8 | 0.79 | 0.97 | 0.99 | 1.00 | 1.00 | 1.00 | 1.00 | 1.00 | 1.00 | 1.00 |
| | 0.9 | 0.83 | 0.97 | 0.99 | 1.00 | 1.00 | 1.00 | 1.00 | 1.00 | 1.00 | 1.00 |
| | 1.0 | 1.00 | 1.00 | 1.00 | 1.00 | 1.00 | 1.00 | 1.00 | 1.00 | 1.00 | 1.00 |

It should be noted that the distribution of errors spreads further away from scaling of 100%, as can be expected.

Figure 5:
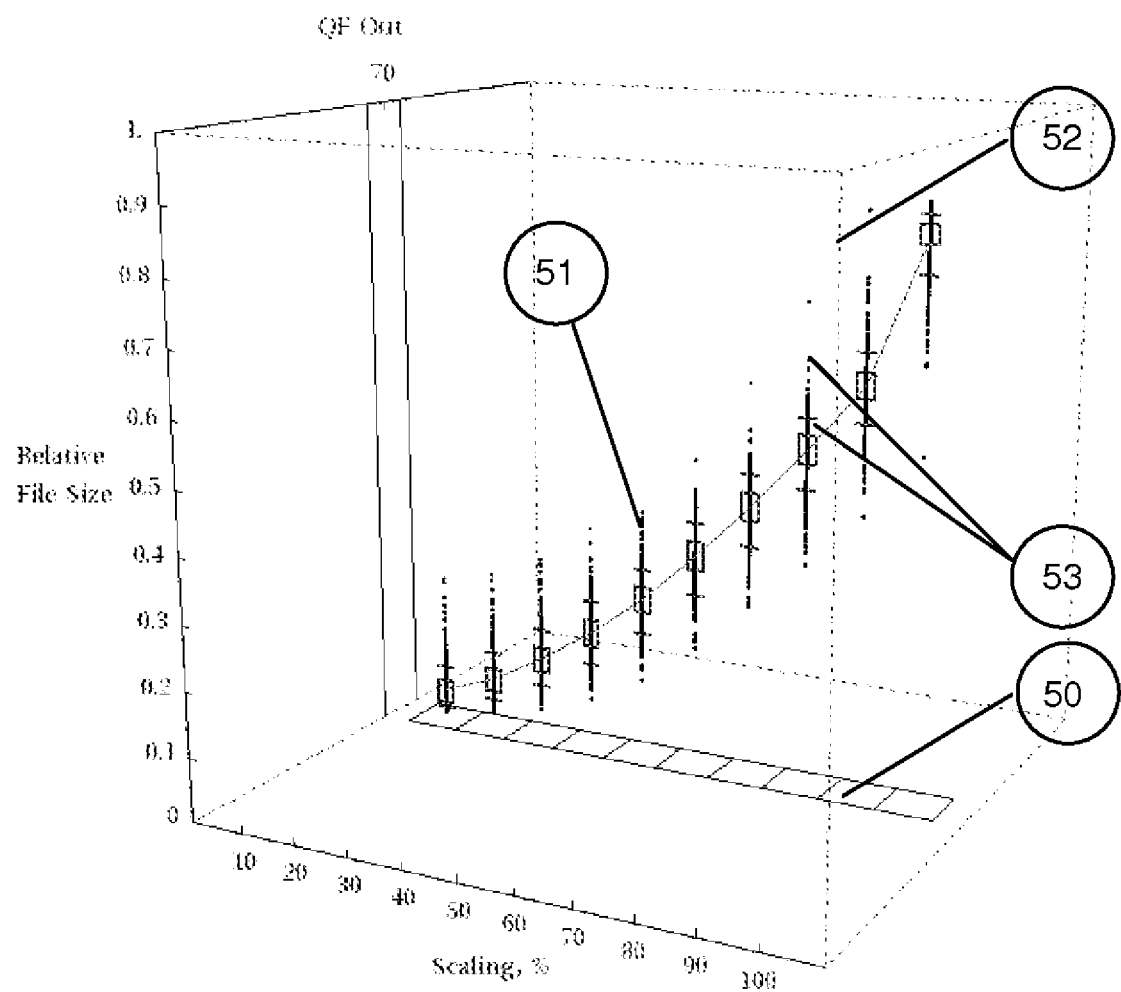
FIG. 5 is a graph illustrating a geometrical interpretation of an estimator $\hat{s}$ or its equivalent array $M_{QF}$.

Turning now to FIG. 5, a geometrical interpretation of the estimator $\hat{s}(\ )$ and the quantized arrays $M_{Q\tilde{F}}$ is given.

FIG. 5 illustrates a series of boxes such as 50 which represent a row of the array $M_{80}$ corresponding to $Q\tilde{F}_{out}=70$, with scaling factors quantized to the nearest 10%.

Above each box 50, the distribution of the actual values of $s(J, Q\tilde{F}_{out}=70)$ of all images which participated in the computation of the estimator $M_{80,70,\tilde{z}}$ is plotted. The distribution of the images is indicated by points. A thin line 51 joins the different least mean square estimators $\hat{s}$; this clearly shows that the surface is not very smooth.

The plots show the quartiles (rectangles such as 52) and the 5%/95% limits are indicated by dashes such as 53. It can be seen from FIG. 5 that the distribution is not a very spread distribution, allowing good amortized bounds on the prediction error, for example.

Some points lying far away above or below of the quartiles can be spotted in FIG. 5. Those points are outliers. Some outliers are images whose files are mostly composed of overhead. When images have a very low resolution, QF and scaling changes affect very little the overall file size because the compressed data is already small compared to the file format overhead, such as headers, markers, etc. However, when the original scale of the image is ignored, then the predictor of file size can break down because a least mean square estimator, given by Equation (1), is sensitive to outliers. Therefore, the original resolution should be included as a prediction parameter.

4. Second Transformed Image File Size Predictor

A predictor of file size 30 according to a second non-restrictive, illustrative embodiment of the present invention will now be described. The predictor of file size 30 takes into consideration the original resolution of the images and thus the presence of outliers.

Figure 3:
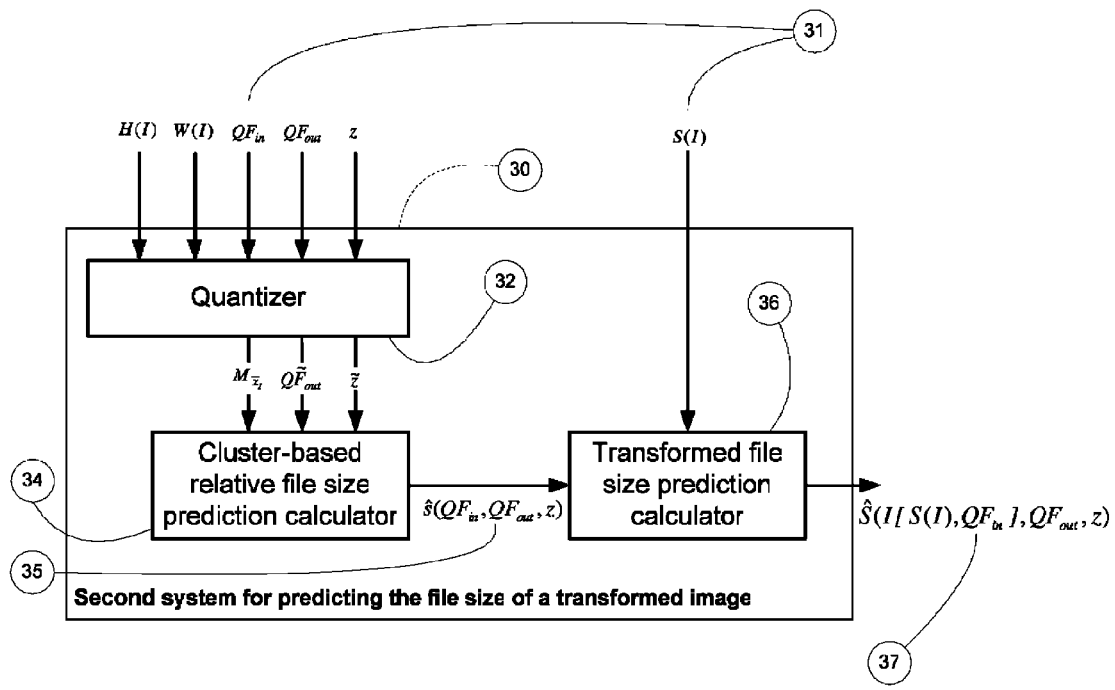
FIG. 3 is a schematic block diagram of a second system for predicting the file size of an image subject to transformation by scaling and a change of quality-controlling parameter, in accordance with a second non-restrictive, illustrative embodiment of the present invention.

Now turning to FIG. 3, the predictor of file size 30 according to the second non-restrictive, illustrative embodiment of the present invention comprises a parameter quantizer 32, and a cluster-based relative file size prediction calculator 34 to produce a relative file size prediction 35.

The predictor of file size 30 is supplied with inputs 31 including the original file size S(I), the original quality factor QF(I) (denoted QF$_{in}$), the width W(I) and the height H(I) of an image I before transformation of the image, as well as the desired quality factor QF$_{out}$ and desired scaling factor (zoom factor) z after transformation of the image. The output 37 of the predictor 30 yields the file size prediction $\hat{S}(I, Q\tilde{F}_{out}, \tilde{z})$ of the image I after transformation of the image to which the scaling factor z and quality factor QF$_{out}$ have been applied.

The quantizer 32 processes the quality factor QF$_{out}$ and scaling factor z to produce a quantized quality factor $Q\tilde{F}_{out}$ and quantized scaling factor $\tilde{z}$, respectively, to serve as inputs to the cluster-based relative file size prediction calculator 34.

A centroid determination also occurs in quantizer 32, which yields an array $M_{\bar{x}_I}$ for image I from its width W(I), height H(I) and original quality factor QF$_{in}$ to serve as input to the cluster-based relative file size prediction calculator 34. If more quality-controlling parameters were used, they would be appended in the vector $x_I$ (to be defined hereinafter) of M$_{\bar{x}_I}$ The cluster-based relative file size prediction calculator 34 receives as input the array $M_{\bar{x}_I}$, the quantized quality factor $Q\tilde{F}_{out}$ and the quantized scaling factor $\tilde{z}$ from the quantizer 32 to formulate the relative file size prediction 35.

Then, the transformed image file size prediction calculator 36 computes the file size prediction 37 $\hat{S}(I, QF_{out}, z)$ of the image I after transformation (image J) using the output 35 from the calculator 34 as follows:

$$\hat{S}(I, QF_{out}, z) = \hat{S}(I, [S(I), QF_{in}], QF_{out}, z) = S(I)\hat{s}(QF_{in}, QF_{out}, z)$$

where the function $\hat{s}(\ )$ is the relative size prediction 35.

As described hereinabove, in cases such as with the presence of outliers, the small resolution of an image breaks down the above described predictor of file size 10. To overcome this issue, segmenting the image space into regions is performed, where regions of similar resolutions are grouped together. To do that, the exemplars generated from the corpus of images will be split into classes using clusters. Furthermore, the use of clustering allows for optimizing a least mean square estimator for each class, thus further minimizing the error of prediction.

It should be noted that clustering is an unsupervised learning technique that partitions data in a given number of disjoint subsets, called classes, so that data in each subset are maximally similar under a chosen metric. For each subset, a representative value or prototype is computed. Generally, the prototype is the centroid of the subset. Clustering is therefore synonymous with probability distribution function optimized vector quantization where the quantization levels are the centroids of the classes.

Figure 4:
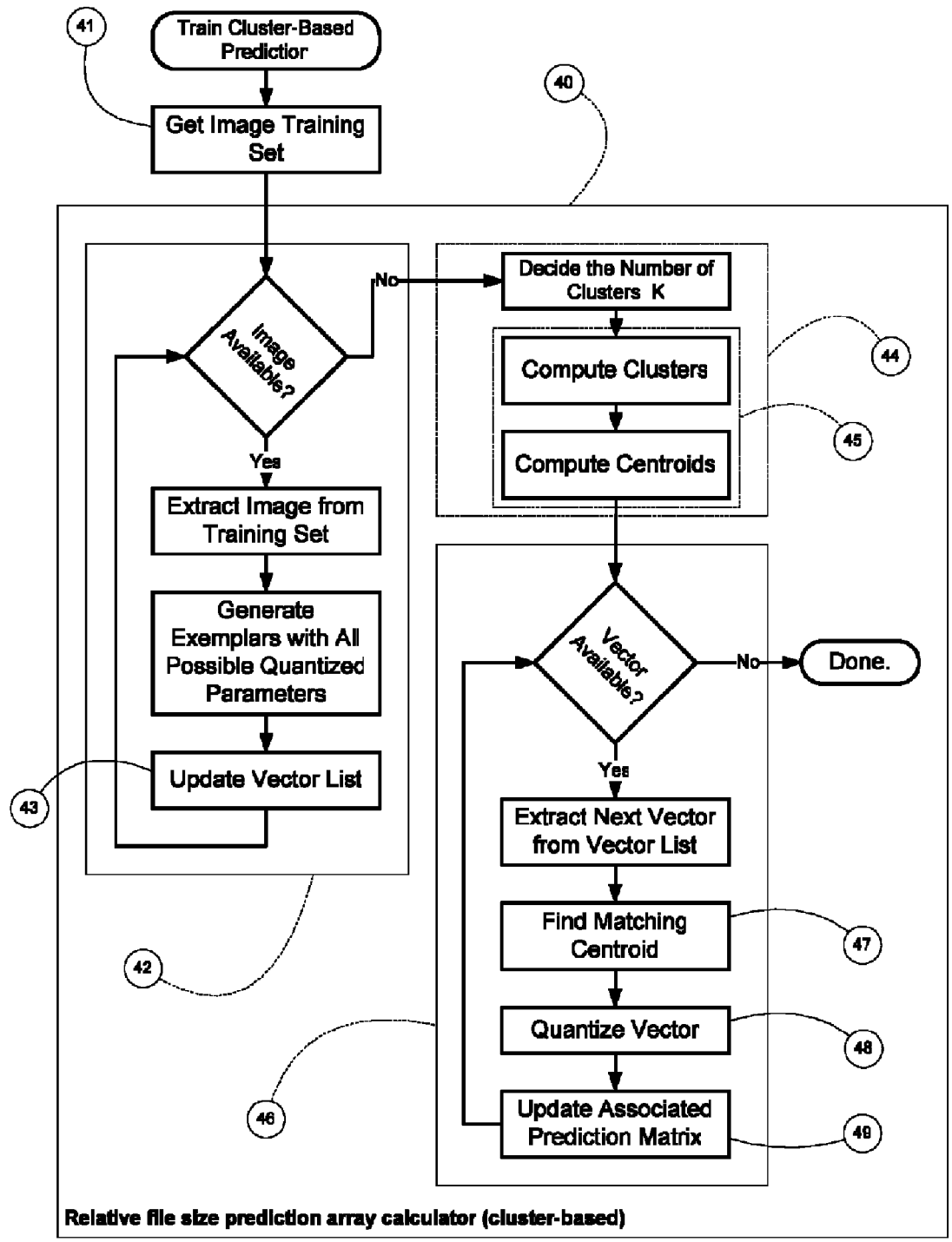
FIG. 4 is a flow chart illustrating the training phase of a second method (corresponding to the second system of FIG. 3) for predicting the file size of an image subject to transformation by scaling and a change of quality-controlling parameter, in accordance with the second non-restrictive, illustrative embodiment of the present invention.

Turning now to FIG. 4, a cluster calculator 44 associates to each image I in the training set T a vector such as $x_I = \{W(I), H(I), \alpha QF(I)\}$, where $\alpha$ is a scaling constant to bring the quality factor dimension to the same order of magnitude as width and height. $W(I)$, $H(I)$, and $QF(I)$ are the width, height and QF of the image I respectively. Were we to use more quality-controlling parameters, they would be appended in the vector $x_I$, and they would be taken into account by this second algorithm.

The number k of classes is chosen prior to clustering. Those of ordinary skill in the art know how to choose such a number k of classes. For example, the parameter k is sufficiently large to reduce the error and yet sufficiently small to avoid context dilution.

Still referring to FIG. 4, the acquisition of the corpus 41 proceeds in the same way as operation 21 in FIG. 2.

The generation of new exemplars 42 proceeds in the same way as operation 22 in FIG. 2 except that sub-operation 24 in FIG. 2 is replaced by a sub-operation 43 consisting of creating vectors $x_I = \{W(I), H(I), \alpha QF(I)\}$ with additional information $QF_{out}$ and $z$.

Therefore, the operation 42 creates exemplar vectors needed by the cluster calculator 44 to calculate a partition C of the training set T of images into a number k of classes.

By definition, the partition C is given by $C = \{C_1, C_2, \ldots, C_k\}$ and will satisfy $\cup_{i=1}^{k} C_i = T$ and $\cap_{i=1}^{k} C_1 = 0$.

Furthermore, an optimal partition C* will minimize the expected squared distance between any vector $x_I$, with $I \in T$, and its assigned centroid. The optimal partition C* is given by:

$$C^* = \underset{C}{\operatorname{argmin}} \sum_{i=1}^{k} \sum_{I \in C_i} \|x_I - \bar{x}_i\|^2 \quad (8)$$

where $\|x\| = \sqrt{x^T x}$ is the familiar $L_2$ norm, T is the transpose function, and $\bar{x}_i$ is the prototype of the class $C_i$.

Figure 6:
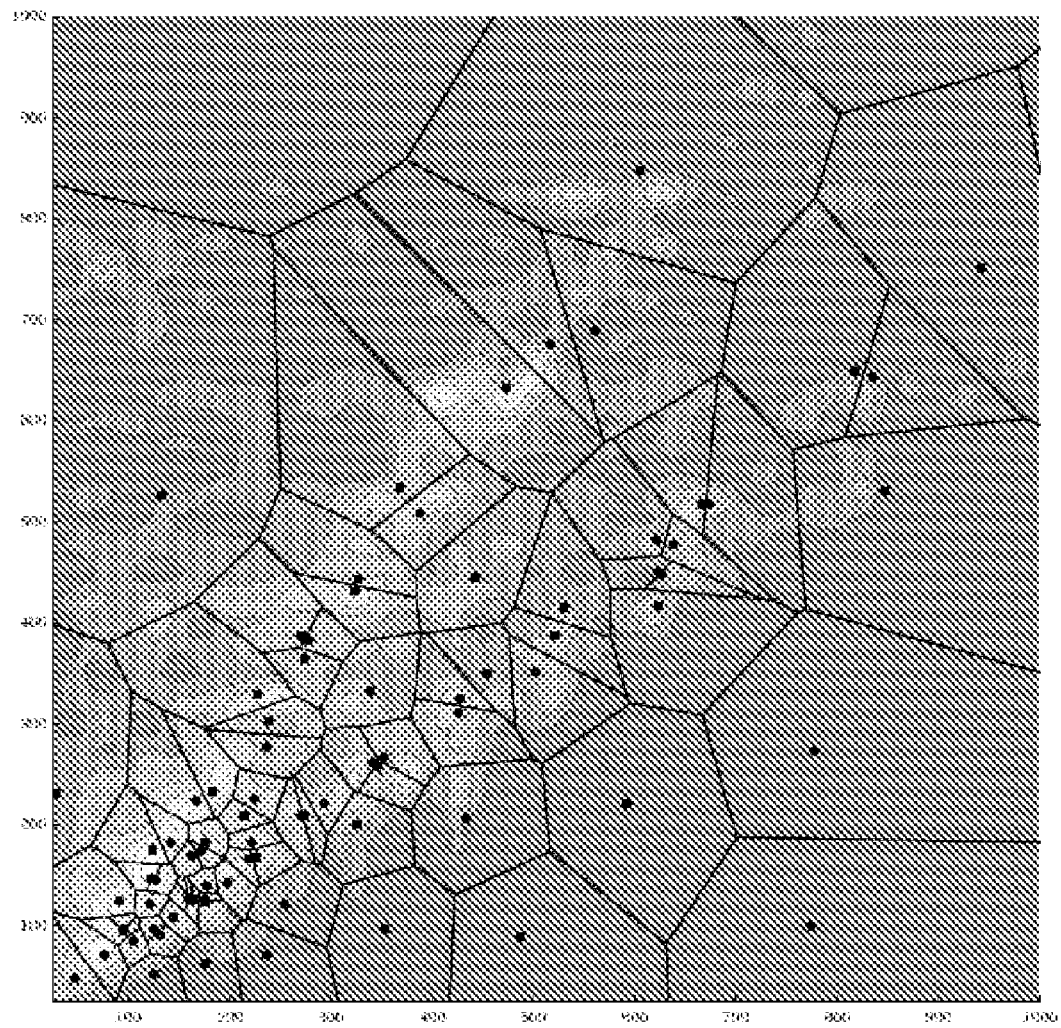
FIG. 6 is a graph of an example of clustering.

An example of clustering is shown in FIG. 6. In FIG. 6, all the images have a QF=80 so that the computed file size prediction can be visualized in two dimensions. However, the real partitions span the three (3) dimensions of width, height and quantized QF.

After the number k of classes has been decided, the cluster calculator 44 (see 45) calculates the classes or clusters using the k-means algorithm. Then a prototype calculator (see 45) calculates the centroid $\bar{x}_i$ as follows:

$$\bar{x}_i = \frac{1}{|c_i|} \sum_{I \in C_i} x_I \quad (9)$$

which represents the prototype of all vectors in class $C_i$.

The complexity of computing the optimal partition C* makes it computationally infeasible. However, it can be approximated with high precision using the k-means algorithm, as disclosed in the article by Leon Bottou and Yoshua Bengio entitled "*Convergence properties of the K-means algorithms*" in G. Tesauro, D. Touretzky and T. Leen, editors, *Advances in Neural Information Processing Systems*, volume 7, pages 585-592, The MIT Press, 1995. Similar to Newton's algorithm, the k-means algorithm has superlinear convergence which, in practice, means that a relatively small number of iterations is required for a good approximation. The details and properties of k-means is believed to be well known to those of ordinary skill in the art and, for that reason, will not be further described in the present specification.

Once the classes or clusters C are computed, the array calculator (see 47 to 49 in FIG. 4) computes an array $M_{\bar{x}_i}$ of relative file size prediction for each computed centroid $\bar{x}_i$.

Each of these prediction arrays has two dimensions in the illustrative embodiment (but would have more if more quality-controlling parameters were used) the quantized output quality factor $Q\tilde{F}_{out}$ and the quantized scaling factor $\tilde{z}$. Quantization is performed in operation 48. Each entry of those arrays is computed as the following:

$$M_{\bar{x}, Q\tilde{F}_{out}, \tilde{z}} = \frac{1}{|C_i|} \sum_{J \in C_i} \frac{S(T(J, Q\tilde{F}_{out}, \tilde{z}))}{S(J)} \quad (10)$$

where $J \in C_i$ is an image that was assigned to the class $C_i$, of cardinality $|C_i|$ and with centroid $\bar{x}_i$.

In order to find an estimator associated to an image J resulting from transformation of an image I, the closest centroid $\bar{x}_J$ is first computed in operation 47 as follows:

$$\bar{x}_J = \underset{\bar{x}_i \in C}{\operatorname{argmin}} \|x_J - \bar{x}_i\| \quad (11)$$

Finally, the cluster-based relative file size prediction calculator of the predictor of file size 30 (FIG. 3) yields the relative file size prediction 35, and the file size prediction 37 is computed in the calculator 38 according to the following equation:

$$\hat{S}(I, Q\tilde{F}_{out}, \tilde{z}) = (\hat{S}(I[S(I), Q\tilde{F}_{in}], Q\tilde{F}_{out}, \tilde{z}) = S(I) M_{\bar{x}_I, Q\tilde{F}_{out}, \tilde{z}} \quad (12)$$

It should be noted that the cost, in terms of computation, in the predictor 30 is limited to the cost of computing the closest centroid, which can be computed efficiently using adequate data structures (for details see Jean-Daniel Boissonnat and Mariette Yvinec, "Algorithmic Geometry", Cambridge University Press, 1998). Once located, the array $M_{\bar{x}_I}$ can be searched in constant time to produce the value of $M_{\bar{x}_I, Q\tilde{F}_{out}, \tilde{z}}$.

5. Second Array Calculator and Training Method

Referring back to FIG. 4, the second method of training the relative size prediction array calculator 40 according to the second non-restrictive, illustrative embodiment of the present invention will now be described.

The second training method can be implemented for the predictor of file size 30.

In operation 42, each image in the corpus is used to generate any desired number of exemplars. In operation 42, a large number of images on which were applied quality-controlling parameters changes and scalings, typically in a way that is compatible with the quantization scheme used in the cluster-based relative file size prediction calculator 34, is generated from an image drawn from the corpus. With each exemplar J are stored its vector $x_J=(W(J),H(J),\alpha QF(J))$, as well as $QF_{out}$ and z.

In sub-operation 43, each of the generated exemplar is added to the examplar list that also includes the original images from the corpus. Operation 42 is repeated as long as there are images left unprocessed in the corpus.

In the cluster calculator 44, a number k of classes or clusters is specified.

In operation 45, the clusters and centroids are computed. A centroid $\bar{x}_i$ is calculated for each cluster or class $C_i$ for $1 \leq i \leq k$, using Equation (9). The arrays $M_{\bar{x}_i}$ are created, but not filled.

In operation 46, the arrays associated to the centroids are populated.

In operation 47, for each exemplar J, the quality factor $QF_{in}(J)$, width H(J) and eight H(J) before transformation of the image are used to find the corresponding centroid and its associated prediction array. The centroid which is the closest to the image I is computed using Equation (11).

In operation 48, the desired quality factor $QF_{out}$ after transformation of the image and scaling factor z are quantized to become respectively $\tilde{QF}_{out}$ and $\tilde{z}$.

Finally, in operation 49, the array $M_{\bar{x}_i}$ of relative file size predictions is updated using $\tilde{QF}_{out}$, $\tilde{z}$ and $x_J=(W(J),H(J),\alpha QF(J))$ after application of the desired quantized quality factor and scaling, using Equation (12).

6. Second Set of Numerical Examples

In experiments, k was chosen such that k=200. It was found empirically that $\alpha \approx 1000$.

Results are presented in Table 4. Table 4 illustrates the expected absolute error for clustered prediction array $M_{\bar{x}_i}$ for images in the corpus with $QF_{in}=80$. The expected absolute error is given by equation (7).

TABLE 4

Expected Relative File Size Prediction Error

| $\tilde{QF}_{out}$ | Scaling, % | | | | | | | | | |
|---|---|---|---|---|---|---|---|---|---|---|
| | 10% | 20% | 30% | 40% | 50% | 60% | 70% | 80% | 90% | 100% |
| 10 | 24.82 | 21.84 | 19.47 | 17.73 | 16.20 | 14.95 | 14.06 | 13.37 | 12.87 | 12.71 |
| 20 | 23.80 | 20.25 | 17.38 | 15.32 | 13.41 | 12.03 | 10.93 | 9.99 | 9.32 | 8.86 |
| 30 | 23.17 | 19.28 | 16.26 | 14.06 | 12.00 | 10.55 | 9.32 | 8.29 | 7.51 | 6.95 |
| 40 | 22.76 | 18.65 | 15.53 | 13.27 | 11.10 | 9.61 | 8.35 | 7.25 | 6.37 | 6.84 |
| 50 | 22.43 | 18.14 | 14.98 | 12.67 | 10.48 | 8.93 | 7.60 | 6.46 | 5.51 | 5.97 |
| 60 | 22.11 | 17.69 | 14.42 | 12.10 | 9.87 | 8.31 | 6.93 | 5.74 | 4.73 | 2.18 |
| 70 | 21.55 | 17.11 | 13.79 | 11.45 | 9.18 | 7.57 | 6.18 | 4.95 | 3.93 | 1.99 |
| 80 | 21.12 | 15.41 | 13.10 | 10.70 | 8.39 | 6.79 | 5.38 | 4.23 | 3.31 | 1.88 |
| 90 | 20.42 | 15.67 | 12.43 | 10.08 | 7.79 | 6.44 | 5.28 | 4.45 | 3.82 | 2.19 |
| 100 | 20.86 | 18.20 | 16.22 | 15.05 | 13.48 | 12.99 | 12.34 | 11.58 | 11.13 | 6.53 |

As with the predictor of file size 10, the minimum errors in the predictor of file size 30 is concentrated around $\tilde{QF}_{in}=\tilde{QF}_{out}=80$, with $\tilde{z}=100\%$. And the maximal prediction error is given by the portion of Table 4 where $\tilde{QF}_{in}$, $\tilde{QF}_{out}$ and scaling factor differ the most, for example, in the upper left of Table 4. Similar to Table 2, the gray portion of Table 4 corresponds to the expected absolute errors of 10% or less. However, when comparing the two (2) gray portions of Tables 2 and 4, the expected absolute errors of Table 4 are significantly smaller than those of Table 2, thanks to the use of clusters. For example, the errors went down from 112.93% to 24.82%, from Table 2 to Table 4, in the most difficult transcoding setting, i.e. with $\tilde{QF}_{out}=10$ and $\tilde{z}=10\%$.

Again, although the system and method according to the non-restrictive illustrative embodiments predict the file size of a JPEG image subject to transformation by scaling and a change of quality-controlling parameter, in this case the QF (Quality Factor), it should be kept in mind that the same concepts can be applied to other types of formats such as GIF (Graphics Interchange Format) and other quality-controlling parameters such as the number of colors, the color depth, the color component sampling structure, etc., and transformations such as color enhancement and cropping.

Although the present invention has been described in the foregoing description by means of non-restrictive illustrative embodiments, these illustrative embodiments can be modified at will within the scope of the appended claims without departing from the spirit and nature of the subject invention.

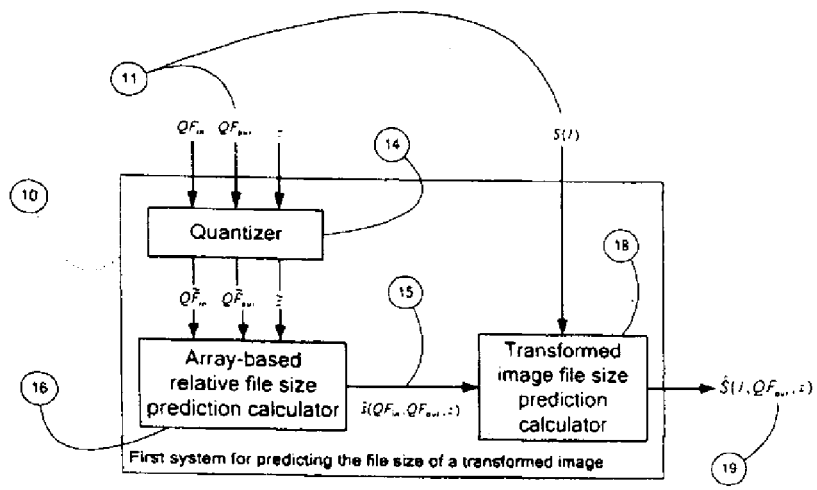

What is claimed is:

1. A system for predicting a file size of an image subject to transformation by scaling and a change of a quality factor, the quality factor being inversely proportional to a quantization parameter of the image, the system comprising:

a processor, and a non-transitory computer readable storage medium having computer readable instructions stored thereon for execution by the processor, causing the processor: to receive (a) a file size of the image before the transformation of the image, (b) information about a quality factor of the image before the transformation, (c) information about a quality factor of the image to be applied to the image during the transformation, and (d) a resolution scaling factor to be applied to the image during the transformation;

and to form: a calculator for determining a relative file size prediction of the image after the transformation based on the received information about the quality factor of the image before the transformation, the quality factor of the image to be applied during the transformation, and the resolution scaling factor; and a calculator for determining a file size prediction of the image after the transformation as a function of the file size of the image before transformation and the relative file size prediction.

2. The system as defined in claim 1, wherein the file size of the image before the transformation and the file size prediction are compressed file sizes.

3. The system as defined in claim 1, wherein the calculator for determining the file size prediction is adapted to multiply the file size of the image before the transformation and the relative file size prediction.

4. The system as defined in claim 1, wherein the calculator for determining the file size prediction $\hat{S}(I,QF_{out},z)$ is adapted to multiply the file size of the image before the transformation and the relative file size prediction $\hat{s}(QF_{in},QF_{out},z)$ using the following relation:

$$\hat{S}(I,QF_{out},z)=\hat{S}(I[S(I),QF_{in}],QF_{out},z)=S(I)\hat{s}(QF_{in},QF_{out},z)$$

where S(I) is the file size of the image I before the transformation, $\hat{s}()$ is the relative file size prediction, $QF_{in}$ is a quality factor of the image before the transformation, $QF_{out}$ is an output quality factor of the image after the transformation, and z is the resolution scaling factor.

5. The system as defined in claim 1, wherein the calculator for determining the relative file size prediction comprises a calculator for determining an array of pre-computed relative file size predictions using a set of training images subject to training transformations.

6. The system as defined in claim 5, wherein the calculator for determining the array of pre-computed relative file size predictions further comprises:
   a quantizer of the quality factor $QF_{in}$, the output quality factor $QF_{out}$, and the resolution scaling factor z to obtain respective quantized quality factors $Q\tilde{F}_{in}, Q\tilde{F}_{out}$ and a quantized resolution scaling factor $\tilde{z}$;
   a set $S_{Q\tilde{F}_{in},Q\tilde{F}_{out},\tilde{z}}$ of images having values of the quality factor $QF_{in}$ quantized to $Q\tilde{F}_{in}$, values for the output quality factor $QF_{out}$ quantized to $Q\tilde{F}_{out}$, and values for the resolution scaling factor z quantized to $\tilde{z}$; and
   the calculator for determining the array of pre-computed relative file size predictions being configured to apply the following relation:

$$M_{Q\tilde{F}_{in},Q\tilde{F}_{out},\tilde{z}} = \frac{1}{|S_{Q\tilde{F}_{in},Q\tilde{F}_{out},\tilde{z}}|} \sum_{J \in S_{Q\tilde{F}_{in},Q\tilde{F}_{out},\tilde{z}}} s(J, QF_{out}(J), z(J))$$

where $M_{Q\tilde{F}_{in},Q\tilde{F}_{out},\tilde{z}}$ in is an entry in the array M, s( ) is a relative size observation, and $|S_{Q\tilde{F}_{in},Q\tilde{F}_{out},\tilde{z}}|$ is a cardinality of the set $S_{Q\tilde{F}_{in},Q\tilde{F}_{out},\tilde{z}}$.

7. The system as defined in claim 6, wherein the calculator for determining the file size prediction $\hat{S}(I,QF_{out},z)$ of the image after the transformation is adapted to use the following relation:

$$\hat{S}(I,QF_{out},z) = (\hat{S}(I[S(I),QF_{in}],QF_{out},z) = S(I)M_{Q\tilde{F}_{in},Q\tilde{F}_{out},\tilde{z}}$$

wherein S(I is a compressed file size of the image I before the transformation.

8. The system as defined in claim 5, wherein the calculator for determining the array of pre-computed relative file size predictions comprises:
   a cluster calculator for (a) associating, with each image of a set of images, a vector representative of characteristics of the image and for (b) partitioning the set of images into classes of images in accordance with vectors associated with the images in the set of images;
   a prototype calculator for calculating, for each class of images, a centroid vector representing vectors associated with the images of the each class of images; and
   an array calculator for computing an array of relative file size predictions for each centroid vector, the array having at least two dimensions including the information about a change of the quality factor of the image before the transformation, the quality factor of the image to be applied to the image during the transformation, and the resolution scaling factor.

9. The system as defined in claim 8, wherein the vector representative of the characteristics of the image I is given by the relation:

$$x_I = (W(I), H(I), \alpha QF(I))$$

where $x_I$ is the vector associated with the image I, $\alpha$ is a scale constant, and W(I), H(I) and QF(I) are respectively a width, a height, and the quality factor of the image I before the transformation.

10. The system as defined in claim 5, wherein the calculator for determining the file size prediction of the image after the transformation is adapted to calculate the file size prediction of the image after the transformation using the file size of the image before the transformation and the array of pre-computed relative file size predictions.

11. The system as defined in claim 5, wherein the computer readable instructions are further configured to store the array of pre-computed relative file size predictions in a first table, indexed by a resolution scaling factor and a quality factor of a training image to be applied during the training transformation.

12. The system as defined in claim 11, wherein the first table is further indexed by a quality factor of the training image before the training transformation.

13. The system as defined in claim 11, wherein the computer readable instructions are further configured to form a second table tabulating an expected error of the relative file size prediction, the second table being indexed by the resolution scaling factor and the quality factor of the training image to be applied during the training transformation.

14. The system as defined in claim 13, wherein the second table is further indexed by the quality factor of the training image before the training transformation.

15. The system as defined in claim 13, wherein the computer readable instructions are further configured to form a third table tabulating probabilities that an absolute value of the expected error is under a predetermined threshold, the third table being indexed by the resolution scaling factor and the quality factor of the training image to be applied during the training transformation, and further indexed by the quality factor of the training image before the training transformation.

16. A method for predicting a file size of an image subject to transformation by scaling and a change of a quality factor, the quality factor being inversely proportional to a quantization parameter of the image, the method comprising steps performed by a digital processor:
   receiving (a) the file size of the image before the transformation of the image, (b) information about a quality factor of the image before the transformation, (c) information about a quality factor of the image to be applied to the image during the transformation, and (d) a resolution scaling factor to be applied to the image during the transformation;
   determining a relative file size prediction of the image after the transformation based on the received information about the quality factor of the image before the transformation, the quality factor of the image to be applied during the transformation, and the resolution scaling factor; and
   determining a file size prediction of the image after the transformation as a function of the file size of the image before the transformation and the relative file size prediction.

17. The method as defined in claim 16, wherein receiving the file size of the image before the transformation comprises receiving a compressed file size of the image before the transformation; and wherein determining the file size prediction of the image after the transformation comprises determining a compressed file size of the image after the transformation.

18. The method as defined in claim 16, wherein the determining the file size prediction of the image after the transformation comprises multiplying the file size of the image before the transformation and the relative file size prediction.

19. The method as defined in claim 16, wherein the step of determining the file size prediction $\hat{S}(I,QF_{out},z)$ comprises multiplying the file size of the image before the transformation and the relative file size prediction $\hat{s}(QF_{in},QF_{out},z)$ using the following relation:

$$\hat{S}(I,QF_{out},z) = \hat{S}(I[S(I),QF_{in}],QF_{out},z) = S(I)\hat{s}(QF_{in},QF_{out},z)$$

where S(I) is the file size of the image I before the transformation, ŝ( ) is the relative file size prediction, $QF_{in}$ is a quality factor of the image before the transformation, $QF_{out}$ is an output quality factor of the image after the transformation, and z is the resolution scaling factor.

20. The method as defined in claim 16, wherein the determining the relative file size prediction comprises pre-computing an array of relative file size predictions using a set of training images subject to training transformations.

21. The method as defined in claim 20, wherein the pre-computing the array of the relative file size predictions further comprises:
  associating, with each image of a set of images, a vector representative of characteristics of the image, and partitioning the set of images into classes of images in accordance with vectors associated with the images in the set of images;
  calculating, for each class of images, a centroid vector representing vectors associated with the images of the each class of images; and
  computing an array of relative file size predictions for each centroid vector, the array having at least two dimensions including the information about a change of the quality factor of the image before the transformation and the quality factor of the image to be applied during the transformation, and the resolution scaling factor.

22. The method as defined in claim 21, wherein the associating the vector comprises using the following relation:

$$x_I = (W(I), H(I), \alpha QF(I))$$

where $x_I$ is the vector associated with the image I, $\alpha$ is a scale constant, and W(I), H(I) and QF(I) are respectively a width, a height, and the quality factor of the image I before the transformation.

23. The method as defined in claim 21, wherein the determining the file size prediction of the image after the transformation comprises using the file size of the image before the transformation and the array of pre-computed relative file size predictions.

24. The method as defined in claim 20, wherein
the pre-computing the array of relative file size predictions further comprises:
  quantizing the quality factor $QF_{in}$, the quality factor $QF_{out}$ and the resolution scaling factor z to obtain respective quantized quality factors $Q\tilde{F}_{in}, Q\tilde{F}_{out}$ and a quantized resolution scaling factor $\tilde{z}$;
  determining a set $S_{Q\tilde{F}_{in}, Q\tilde{F}_{out}, \tilde{z}}$ of images having values of the quality factor $QF_{in}$ quantized to $Q\tilde{F}_{in}$, values of the output quality factor $QF_{out}$ quantized to $Q\tilde{F}_{out}$, and values for the resolution scaling factor z quantized to $\tilde{z}$; and
  calculating entries in the array of pre-computed relative file size predictions using the following relation:

$$M_{Q\tilde{F}_{in}, Q\tilde{F}_{out}, \tilde{z}} = \frac{1}{\left|S_{Q\tilde{F}_{in}, Q\tilde{F}_{out}, \tilde{z}}\right|} \sum_{J \in S_{Q\tilde{F}_{in}, Q\tilde{F}_{out}, \tilde{z}}} s(J, QF_{out}(J), z(J))$$

where s( ) is a relative size observation, and $|S_{Q\tilde{F}_{in}, Q\tilde{F}_{out}, \tilde{z}}|$ is a cardinality of the set $S_{Q\tilde{F}_{in}, Q\tilde{F}_{out}, \tilde{z}}$.

25. The method as defined in claim 24, wherein calculating the file size prediction $\hat{S}(I, QF_{out}, z)$ of the image after the transformation comprises using the following relation:

$$\hat{S}(I, QF_{out}, z) = (\hat{S}(I[S(I), QF_{in}], QF_{out}, z) = S(I) M_{Q\tilde{F}_{in}, Q\tilde{F}_{out}, \tilde{z}}$$

where S(I) is a compressed file size of the image I before the transformation.

26. The method as defined in claim 20, further comprising storing the array of pre-computed relative file size predictions in a first table, indexed by a resolution scaling factor and a quality factor of a training image to be applied during a training transformation.

27. The method as defined in claim 26, further comprising indexing the first table by a quality factor of a training image before the training transformation.

28. The method as defined in claim 26, further comprising tabulating an expected error of the relative file size prediction in a second table, the second table being indexed by the resolution scaling factor and the quality factor of the training image to be applied during the training transformation.

29. The method as defined in claim 28, further comprising indexing the second table by a quality factor of the training image before the training transformation.

30. The method as defined in claim 28, further comprising tabulating probabilities that an absolute value of the expected error is under a predetermined threshold, in a third table, the third table being indexed by the resolution scaling factor and the quality factor of the training image to be applied during the training transformation, and further indexed by the quality factor of the training image before the training transformation.

* * * * *

UNITED STATES PATENT AND TRADEMARK OFFICE
CERTIFICATE OF CORRECTION

PATENT NO. : 8,224,104 B2
APPLICATION NO. : 12/741032
DATED : July 17, 2012
INVENTOR(S) : Steven Pigeon et al.

It is certified that error appears in the above-identified patent and that said Letters Patent is hereby corrected as shown below:

Column 16, line 56, in the formula, " $\hat{S}$ " should be -- $\hat{s}$ --.

Column 16, line 59 to 60, the formula should appear as follows:

$$\hat{S}(I, QF_{out}, z) = \hat{S}(I[S(I), QF_{in}], QF_{out}, z) = S(I)\hat{s}(QF_{in}, QF_{out}, z).$$

Column 17, line 33, "S(l is" should read as --S(l) is--.

Column 18, line 66 to 67, the formula should appear as follows:

$$\hat{S}(I, QF_{out}, z) = \hat{S}(I[S(I), QF_{in}], QF_{out}, z) = S(I)\hat{s}(QF_{in}, QF_{out}, z).$$

Signed and Sealed this
Twenty-eighth Day of August, 2012

David J. Kappos
*Director of the United States Patent and Trademark Office*

UNITED STATES PATENT AND TRADEMARK OFFICE
CERTIFICATE OF CORRECTION

PATENT NO. : 8,224,104 B2
APPLICATION NO. : 12/741032
DATED : July 17, 2012
INVENTOR(S) : Steven Pigeon et al.

It is certified that error appears in the above-identified patent and that said Letters Patent is hereby corrected as shown below:

The title page showing the illustrative figure should be deleted to be replaced with the attached title page.

In the drawing sheets, consisting of Figs. 1-2, should be deleted to be replaced with the drawing sheets, consisting of Figs. 1-2, as shown on the attached pages.

In the Specification

In Column 8, line 25, formula 5 should appear as follows:

$$M_{Q\tilde{F}_{in}, Q\tilde{F}_{out}, \tilde{z}} = \frac{1}{\left| S_{Q\tilde{F}_{in}, Q\tilde{F}_{out}, \tilde{z}} \right|} \sum_{J \in S_{Q\tilde{F}_{in}, Q\tilde{F}_{out}, \tilde{z}}} s(J, QF_{out}(J), z(J)) \quad (5)$$

In Column 10, line 15, formula (5) should appear as follows:

$$M_{Q\tilde{F}_{in}, Q\tilde{F}_{out}, \tilde{z}} = \frac{1}{\left| S_{Q\tilde{F}_{in}, Q\tilde{F}_{out}, \tilde{z}} \right|} \sum_{J \in S_{Q\tilde{F}_{in}, Q\tilde{F}_{out}, \tilde{z}}} s(J, QF_{out}(J), z(J)) \quad (5)$$

In Column 15, line 31, there is missing a parenthesis before the letter W and should appear as follows:
-- (W(J), H(J),$^{\alpha}$QF(J)) --

Signed and Sealed this
Third Day of September, 2013

Teresa Stanek Rea
*Acting Director of the United States Patent and Trademark Office*

CERTIFICATE OF CORRECTION (continued)
U.S. Pat. No. 8,224,104 B2

In the Claims

In Column 17, line 20, in claim 6, the formula (5) should appear as follows:

$$M_{Q\tilde{F}_{in},Q\tilde{F}_{out},\tilde{z}} = \frac{1}{\left|S_{Q\tilde{F}_{in},Q\tilde{F}_{out},\tilde{z}}\right|} \sum_{J \in S_{Q\tilde{F}_{in},Q\tilde{F}_{out},\tilde{z}}} s(J, QF_{out}(J), z(J)) \quad (5)$$

In Column 20, line 9, in claim 24, the formula (5) should appear as follows:

$$M_{Q\tilde{F}_{in},Q\tilde{F}_{out},\tilde{z}} = \frac{1}{\left|S_{Q\tilde{F}_{in},Q\tilde{F}_{out},\tilde{z}}\right|} \sum_{J \in S_{Q\tilde{F}_{in},Q\tilde{F}_{out},\tilde{z}}} s(J, QF_{out}(J), z(J)) \quad (5)$$

(12) United States Patent
Pigeon et al.

(10) Patent No.: US 8,224,104 B2
(45) Date of Patent: Jul. 17, 2012

(54) SYSTEM AND METHOD FOR PREDICTING THE FILE SIZE OF IMAGES SUBJECT TO TRANSFORMATION BY SCALING AND A CHANGE OF QUALITY-CONTROLLING PARAMETERS

(75) Inventors: Steven Pigeon, Blainville (CA); Jean-François Franche, Mascouche (CA); Stéphane Coulombe, Brossard (CA)

(73) Assignee: Ecole de Technologie Superieure, Montreal (CA)

( * ) Notice: Subject to any disclaimer, the term of this patent is extended or adjusted under 35 U.S.C. 154(b) by 0 days.

(21) Appl. No.: 12/741,032

(22) PCT Filed: Nov. 2, 2007

(86) PCT No.: PCT/CA2007/001974
§ 371 (c)(1),
(2), (4) Date: May 2, 2010

(87) PCT Pub. No.: WO2009/055896
PCT Pub. Date: May 7, 2009

(65) Prior Publication Data
US 2010/0254629 A1 Oct. 7, 2010

(51) Int. Cl.
*G06K 9/36* (2006.01)
*G06F 15/177* (2006.01)

(52) U.S. Cl. ........ 382/239; 715/735; 382/232; 382/233; 382/235; 382/240

(58) Field of Classification Search .................. 382/232, 382/233, 235, 240; 375/240.16
See application file for complete search history.

(56) References Cited

U.S. PATENT DOCUMENTS

| 6,154,572 A | 11/2000 | Chaddha |
| 6,233,359 B1 | 5/2001 | Ratnakar |
| 6,421,467 B1 * | 7/2002 | Mitra ............. 382/240 |

(Continued)

FOREIGN PATENT DOCUMENTS

WO   WO 2006/085301   8/2006

(Continued)

OTHER PUBLICATIONS

Shatz et al. "Image adaptation with target size, quality and resolution constraints", WO 2006/085301 A2 Published Aug. 17, 2006.*

(Continued)

*Primary Examiner* — Chan Park
*Assistant Examiner* — Ha Le
(74) *Attorney, Agent, or Firm* — IP-MEX Inc.; Victoria Donnelly

(57) ABSTRACT

A system and method for predicting a file size of an image subject to transformation by scaling and a change about at least one quality-controlling parameter, in which an input receives (a) the file size of the image before transformation, (b) information about at least one quality-controlling parameter of the image before transformation, (c) information about at least one quality-controlling parameter for application to the image during transformation, and (d) a scaling factor for application to the image during transformation. A relative size prediction is calculated on the basis of the received quality-controlling parameters information and scaling factor. The file size of the image after transformation is finally calculated as a function of the file size of the image before transformation and the calculated relative size prediction.

30 Claims, 7 Drawing Sheets